(12) United States Patent
Smith et al.

(10) Patent No.: US 8,070,172 B1
(45) Date of Patent: Dec. 6, 2011

(54) LEANING VEHICLE SUSPENSION

(75) Inventors: Edward M. Smith, Oxford, MS (US);
Robert E. McIver, Taylor, MS (US)

(73) Assignee: TreMoto, LLC, Canton, MS (US)

( * ) Notice: Subject to any disclaimer, the term of this patent is extended or adjusted under 35 U.S.C. 154(b) by 188 days.

(21) Appl. No.: 12/705,569

(22) Filed: Feb. 12, 2010

(51) Int. Cl.
*B60G 21/00* (2006.01)

(52) U.S. Cl. .......................... 280/124.103; 280/124.135

(58) Field of Classification Search ........... 280/124.103, 280/124.134, 124.135, 124.136, 124.138, 280/124.14, 124.143, 781, 787; 180/311
See application file for complete search history.

(56) References Cited

U.S. PATENT DOCUMENTS

| | | | | |
|---|---|---|---|---|
| 4,288,096 A * | 9/1981 | Enokimoto et al. | ... | 280/124.136 |
| 4,407,383 A * | 10/1983 | Enokimoto et al. | .......... | 180/291 |
| 4,546,997 A * | 10/1985 | Smyers | ...................... | 280/5.509 |
| 4,624,469 A | 11/1986 | Bourne, Jr. | | |
| 4,887,829 A * | 12/1989 | Prince | ........................... | 280/282 |
| 5,005,859 A | 4/1991 | Satoh et al. | | |
| 5,765,846 A * | 6/1998 | Braun | ..................... | 280/124.103 |
| 6,827,361 B2 * | 12/2004 | Seki | ........................ | 280/124.134 |
| 7,487,985 B1 * | 2/2009 | Mighell | ................. | 280/124.103 |
| 7,530,419 B2 | 5/2009 | Brudeli | | |
| 7,571,787 B2 * | 8/2009 | Saiki | ............................. | 180/210 |
| 7,591,337 B2 | 9/2009 | Suhre et al. | | |
| 7,631,721 B2 * | 12/2009 | Hobbs | ........................... | 180/348 |
| 7,967,306 B2 * | 6/2011 | Mighell | ................. | 280/124.103 |
| 8,016,302 B1 * | 9/2011 | Reeve | .............................. | 280/62 |
| 2007/0075517 A1 | 4/2007 | Suhre et al. | | |
| 2007/0151780 A1 * | 7/2007 | Tonoli et al. | ................. | 180/65.1 |
| 2007/0176384 A1 | 8/2007 | Brudeli | | |
| 2007/0182120 A1 * | 8/2007 | Tonoli et al. | ........... | 280/124.142 |
| 2007/0193815 A1 * | 8/2007 | Hobbs | ........................... | 180/348 |

OTHER PUBLICATIONS

Millennium Motorcycles, MMT 280897—Tracer Steering Geometry (Dec. 6, 2000) (1 sheet), Millennium Motorcycles, North Fremantle, Australia.
Millennium Motorcycles, MMT 030100—Tracer Steering Hub Honda VT 250 Wheels (Dec. 6, 2000) (3 sheets), Millennium Motorcycles, North Fremantle, Australia.
Millennium Motorcycles, HyperTrike (Dec. 6, 2000) (6 sheets), Millennium Motorcycles, North Fremantle, Australia.
Peraves AG, Monotracer—Expanding a Sustainable Concept of Driving (Apr. 3, 2008) (12 pages), Peraves AG, Winterthur, Switzerland.
Suzuki Motor Corporation, TL1000 Motorcycle Service Manual (1997) (rotary damper shown on pages 6-33, 6-34, 6-35, and 6-36) Suzuki Motor Corporation, Takatsuka, Japan.
Yamaha Corporation, YZ250T1 Motorcycle Parts Reference (2005) (rear wheel shown in Drawing 5NY1100-A271) (1 sheet), Yamaha Corporation, Shizuoka, Japan.

* cited by examiner

*Primary Examiner* — Faye M. Fleming
(74) *Attorney, Agent, or Firm* — Walker, McKenzie & Walker, P.C.

(57) ABSTRACT

A leaning vehicle suspension. Preferred embodiments have two transversely-mounted steerable front wheels and a single rear wheel, but the vehicle suspension of the present invention may be used with two-wheeled vehicles or four-wheeled vehicles, and front and rear coupled vehicle suspensions may be employed. Two preferred embodiments of the vehicle suspension of the present invention are described. Both have a transverse leaf spring, left and right rotary dampers, and independent left and right parallelogram transverse control arms movably mounting left and right wheel mounting members to the vehicle's frame. A rocker member, to which the rotary dampers and leaf spring are mounted, is pivotally mounted to the vehicle frame by a central pivot bearing, permitting the rocker member to pivot about a longitudinal axis of the vehicle. The parallelogram geometry holds the front wheels at even camber throughout the suspension travel.

6 Claims, 26 Drawing Sheets

LEANING VEHICLE SUSPENSION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to vehicles, and in particular, to a vehicle suspension for a leaning vehicle, i.e., one that leans side-to-side as it turns.

2. Information Disclosure Statement

Motorcycle accidents claim over 5,000 lives per year and over 1,000 lives per year in single-vehicle accidents. Two-wheeled motorized vehicles such as motorcycles have excellent acceleration, efficiency, and cornering prowess, but poor control and stability. Four-wheeled vehicles such as all-terrain vehicles ("ATVs") have good control and stability but lack the efficiency and cornering ability of motorcycles.

Motorcycles are known to be susceptible to so-called "low-side crashes", which are caused by loss of front wheel traction during a turn, and which are the most prevalent cause of single-vehicle motorcycle accidents. Motorcycles are also known to be susceptible to so-called "high-side crashes", which are caused by a sudden increase in rear wheel traction that quickly leans a motorcycle out of a turn, and which are the most violent of single-vehicle motorcycle accidents.

It is therefore desirable to have a safer leaning vehicle suspension that provides a stable high-performance vehicle, that substantially eliminates low-side crashes and high-side crashes common in prior art vehicles, and that combines the high cornering speeds and low vehicle weight of a motorcycle with stability and control heretofore only possible with four-wheeled vehicles.

It is further desirable to have improved front wheel braking performance as compared with prior art two-wheeled motorcycles, and to significantly reduce the danger of front wheel lockup under heavy braking conditions.

It is still further desirable to provide a leaning vehicle suspension that improves safety and permits use with a fuel-efficient vehicle that has high performance while also being inexpensive to construct.

Prior art three-wheeled ATV designs are known that were popular in the late 1980s, subsequently banned as unsafe by the Consumer Product Safety Commission, which had a single steerable front wheel and a pair of rear wheels mounted on a solid rear axle. Such prior art designs are incapable of nimble handling and have poor performance characteristics.

Two principal factors, namely, gyroscopic forces and steering input, are known to affect balance and stability of a two-wheeled vehicle.

Typically, gyroscopic precession forces only contribute significantly to balance at high speed. Greater wheel masses, of course, impart greater stabilizing forces. When riding a motorcycle at high speeds, it can be noted that steering effort becomes "heavy". The rider experiences a much higher resistance to steering inputs because of the gyroscopic stabilization effect. However, at low speeds this effect is quite minor and not nearly significant enough to generate the forces required to balance a motorcycle. Experimentation with vehicles equipped with counter-rotating wheel weights confirms that two-wheeled vehicle balance and stability remain largely intact even when gyroscopic forces have been canceled.

By far the greatest influence on two-wheeled vehicle balance is steering input. As long as the vehicle and rider's combined center of gravity sits on the line connecting the front and rear, a two-wheeled vehicle is in balance. As anyone who has ever ridden a bicycle through a puddle might notice, tracks left by the front wheel are akin to a sine wave, weaving left and right across the track of the rear wheel. Balance on a two-wheeled vehicle is a series of falls. As described from a rider's perspective, when the bicycle starts to tip to the left, for example, the center of gravity also moves left. Thus, to maintain balance, the rider must steer left so that the front wheel moves left. At some point in this maneuver, the bicycle leans back upright. In a typical case, however, the rider will still have the handlebars turned slightly left, causing the center of gravity to move to the right of the line connecting the front and rear ground contact patches, thereby causing the bicycle to now lean to the right. The rider compensates by steering to the right, and the process repeats. Skilled riders are often so smooth, and their oscillations so minor, that this balance mechanism goes unnoticed. Performance motorcycle riding schools worldwide, however, teach the mantra "push right to go right". In other words, pushing on the right handlebar (which turns the front wheel to the left) initiates a rightward vehicle lean. This "fall" allows the rider to set a cornering lean angle that is appropriate for the vehicle's speed and intended trajectory. The rider then turns the front wheel back to the right to maintain balance.

The inventors are aware of the following patents and publications, some of which may be relevant to the present invention: Bourne, Jr., U.S. Pat. No. 4,624,469 (issued Nov. 25, 1986); Satoh et al., U.S. Pat. No. 5,005,859 (issued Apr. 9, 1991); Brudeli, U.S. Pat. No. 7,530,419 (issued May 12, 2009); Suhre et al., U.S. Pat. No. 7,591,337 (issued Sep. 22, 2009); Suhre et al., U.S. Patent Application Publication No. US 2007/0075517 A1 (published Apr. 5, 2007); Brudeli, U.S. Patent Application Publication No. US 2007/1076384 A1 (published Aug. 2, 2007); *MMT 280897—Tracer Steering Geometry* (Dec. 6, 2000) (Millennium Motorcycles, North Fremantle, Australia); *MMT 030100—Tracer Steering Hub Honda VT 250 Wheels* (Dec. 6, 2000) (Millennium Motorcycles, North Fremantle, Australia); *HyperTrike* (Dec. 6, 2000) (Millennium Motorcycles, North Fremantle, Australia); *Monotracer—Expanding a Sustainable Concept of Driving* (Apr. 3, 2008) (Peraves AG, Winterthur, Switzerland); *TL1000 Motorcycle Service Manual* (1997) (rotary damper shown on pages 6-33, 6-34, 6-35, and 6-36) (Suzuki Motor Corporation, Takatsuka, Japan); *YZ250T1 Motorcycle Parts Reference* (2005) (rear wheel shown in Drawing 5NY1100-A271) (Yamaha Corporation, Shizuoka, Japan).

None of these references, either singly or in combination, discloses or suggests the present invention.

BRIEF SUMMARY OF THE INVENTION

The present invention is a vehicle suspension for use with a leaning vehicle. It shall be understood that the term "leaning vehicle suspension", as used herein, refers to a vehicle suspension for vehicles that lean side-to-side during turns. The preferred embodiments have two transversely-mounted steerable front wheels and a single rear wheel, but the leaning vehicle suspension of the present invention may be used with two-wheeled vehicles or four-wheeled vehicles, and front and rear coupled vehicle suspensions of the present design may be employed.

Two preferred embodiments of the leaning vehicle suspension of the present invention are described. Both have a transverse leaf spring, left and right rotary dampers, and independent left and right parallelogram transverse control arms movably mounting left and right wheel mounting members to the vehicle's frame. A rocker member, to which the rotary dampers and leaf spring are mounted, is pivotally mounted to the vehicle frame by a central pivot bearing, permitting the rocker member to pivot about a longitudinal axis of the vehicle. The parallelogram geometry holds the front wheels at even camber throughout the suspension travel.

It is an object of the present invention to provide a safer leaning vehicle suspension than heretofore known, which permits a stable high-performance vehicle, which substantially eliminates low-side crashes and high-side crashes common in prior art vehicles, and which combines the high cornering speeds and low vehicle weight of a motorcycle with stability and control heretofore only possible with four-wheeled vehicles.

It is a further object of the present invention to provide improved front wheel braking performance as compared with prior art two-wheeled motorcycles, and to significantly reduce the danger of front wheel lockup under heavy braking conditions.

It is another object of the present invention to provide a leaning vehicle suspension that improves safety and permits use with a fuel-efficient vehicle that has high performance while also being inexpensive to construct.

Experimental tests with a three-wheeled prototype of the present invention incorporate the leaning vehicle suspension of the present invention as a replacement for the front wheel and suspension fork assembly of a conventional motorcycle. These tests have shown that, despite a three-wheeled configuration, gyroscopic forces are immaterial to overall balance, and braking performance is improved as compared to a two-wheeled motorcycle.

DETAILED DESCRIPTION OF THE INVENTION

Figure 1:
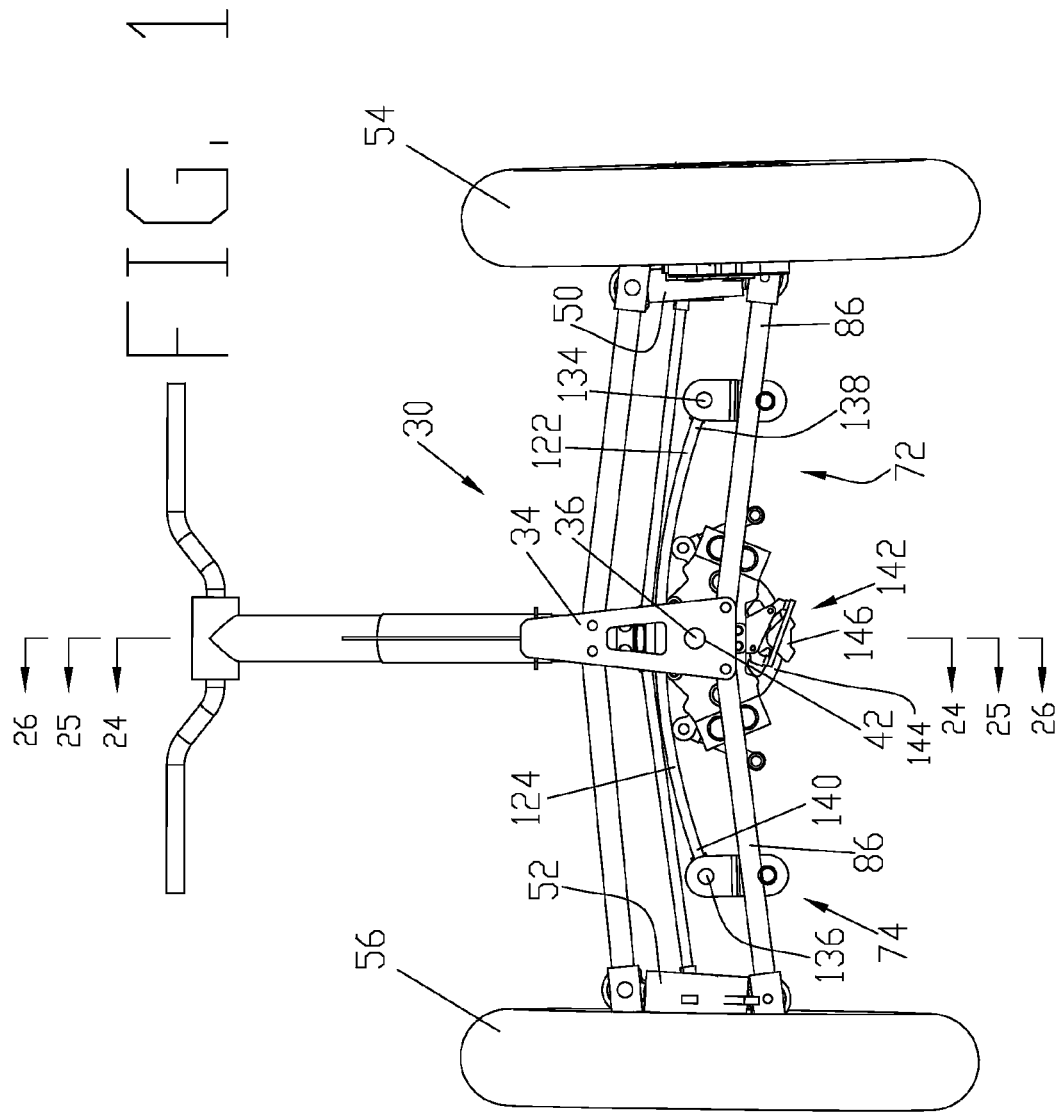
FIG. 1 is a front view of a vehicle with the first embodiment of the present invention.
Figure 2:
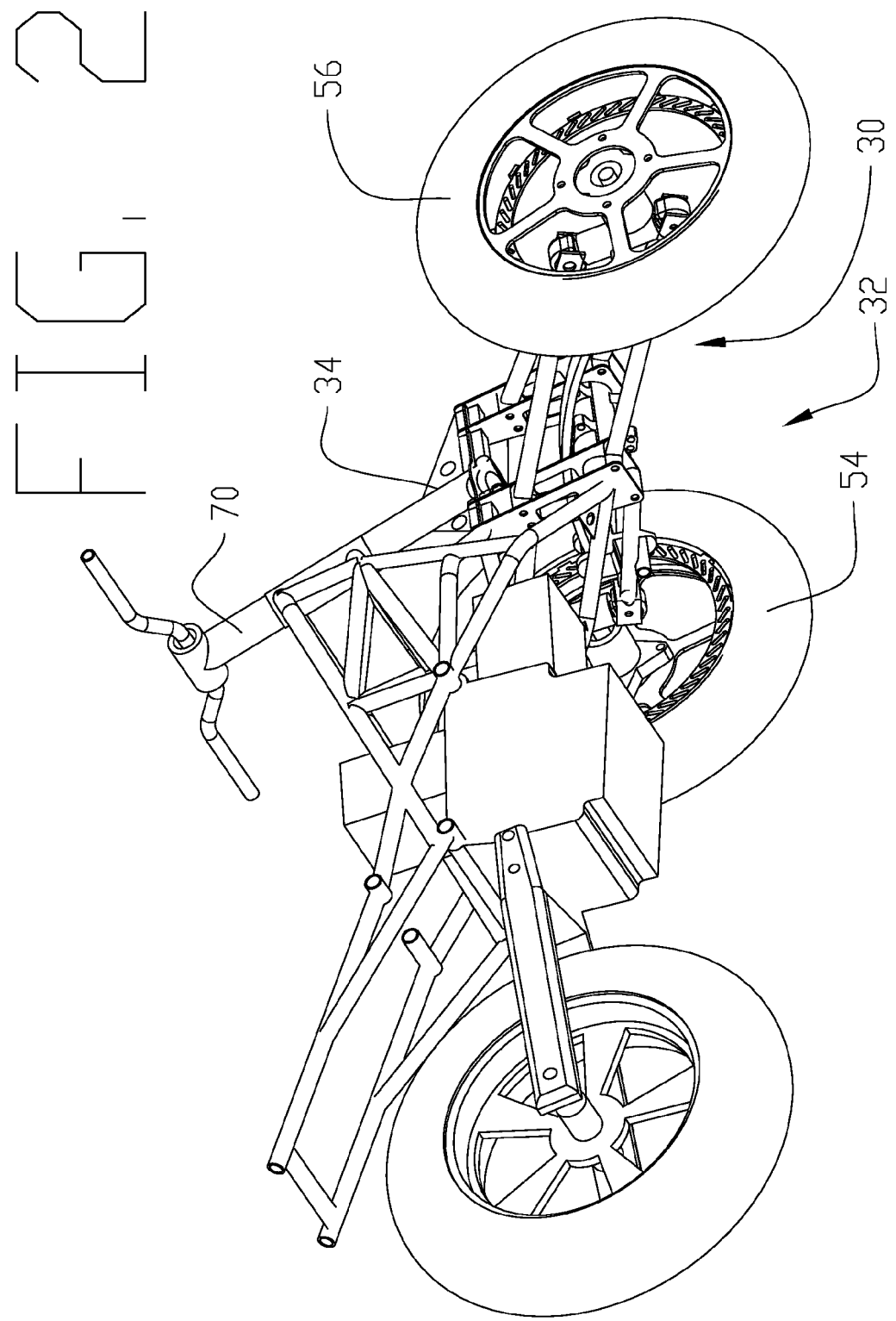
FIG. 2 is a rear side perspective model view of the vehicle with the first embodiment of the present invention.

Referring to FIGS. 1-16 and 24-26 showing the first embodiment 30 of the leaning vehicle suspension of the present invention and FIGS. 17-23 showing the second embodiment 2.30 of the leaning vehicle suspension of the present invention, many similarities are seen between the two embodiments. Because of the many similarities between the two embodiments, after the structure and operation of the first embodiment is described, only the differences between the first embodiment and the second will be discussed in detail, it being understood that similar structure for the two embodiments serves similar purpose. The reference numerals for the various parts of the second embodiment shall be understood to have a prefix identifying the second embodiment (e.g., "2.") and a suffix identifying the particular structure (e.g., "34", "36", etc.) corresponding to the first embodiment's similar structure.

First embodiment 30 of the leaning suspension for a vehicle 32 is seen to be mounted for explanation and testing purposes in replacement of the front wheel and suspension fork assembly of a conventional motorcycle. Vehicle 32 has a vehicle frame 34, and vehicle frame 34 has a longitudinal axis 36, explained hereinbelow, about which pivoting occurs in the present invention.

Figure 3:
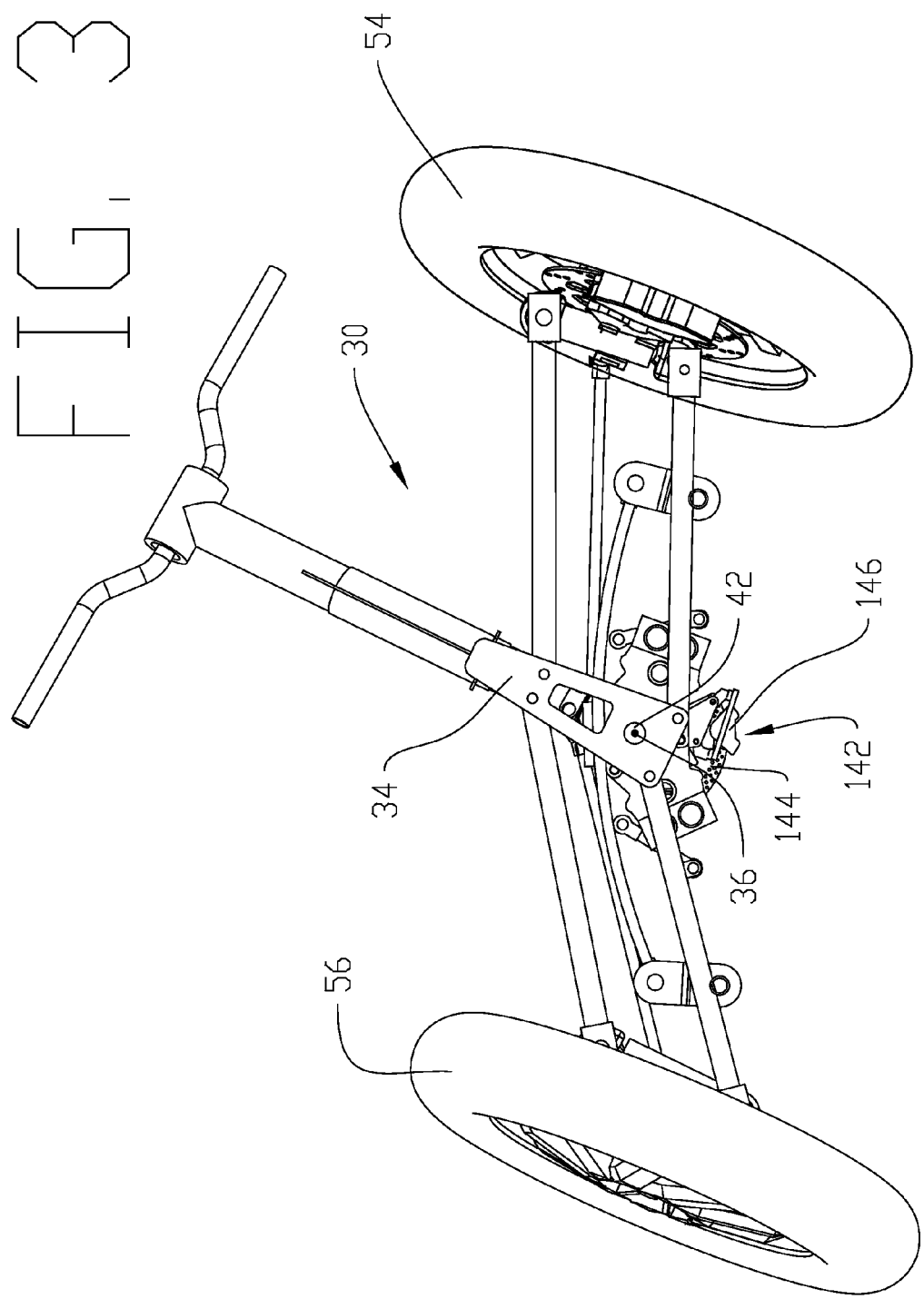
FIG. 3 is a front perspective view of the first embodiment of the present invention shown leaning to one side.
Figure 4:
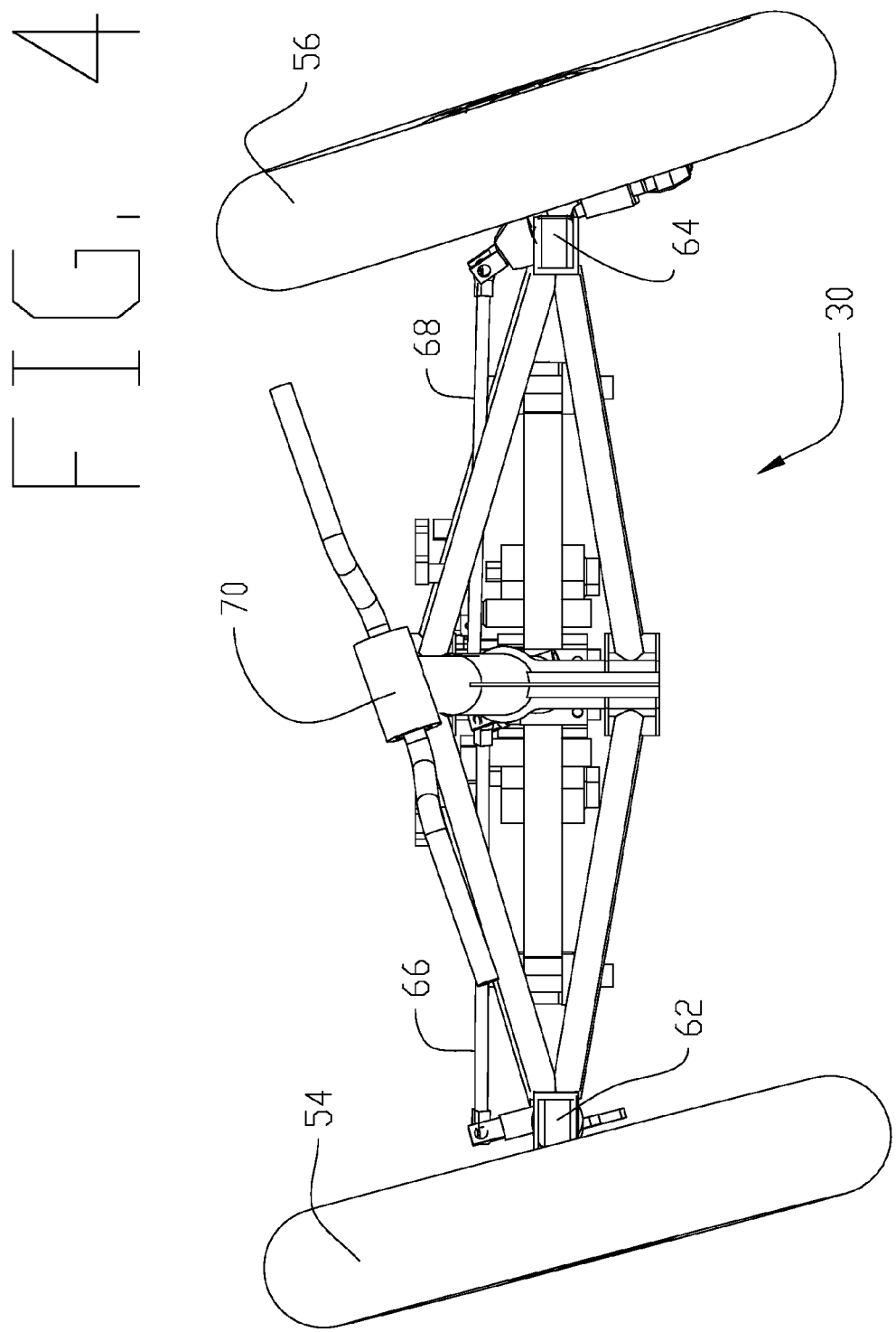
FIG. 4 is a top perspective view of the first embodiment of the present invention.
Figure 5:
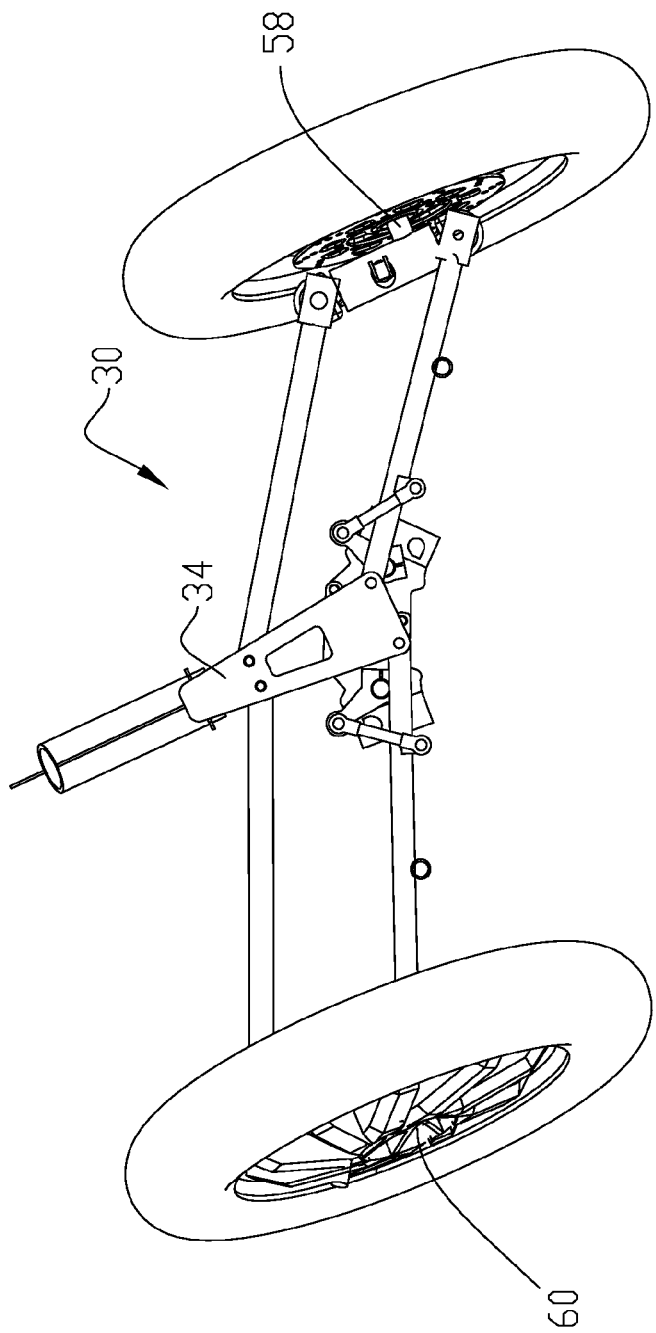
FIG. 5 is a rear perspective view of the first embodiment of the present invention, similar to FIG. 3 but with some parts removed to show the rotary dampers.
Figure 6:
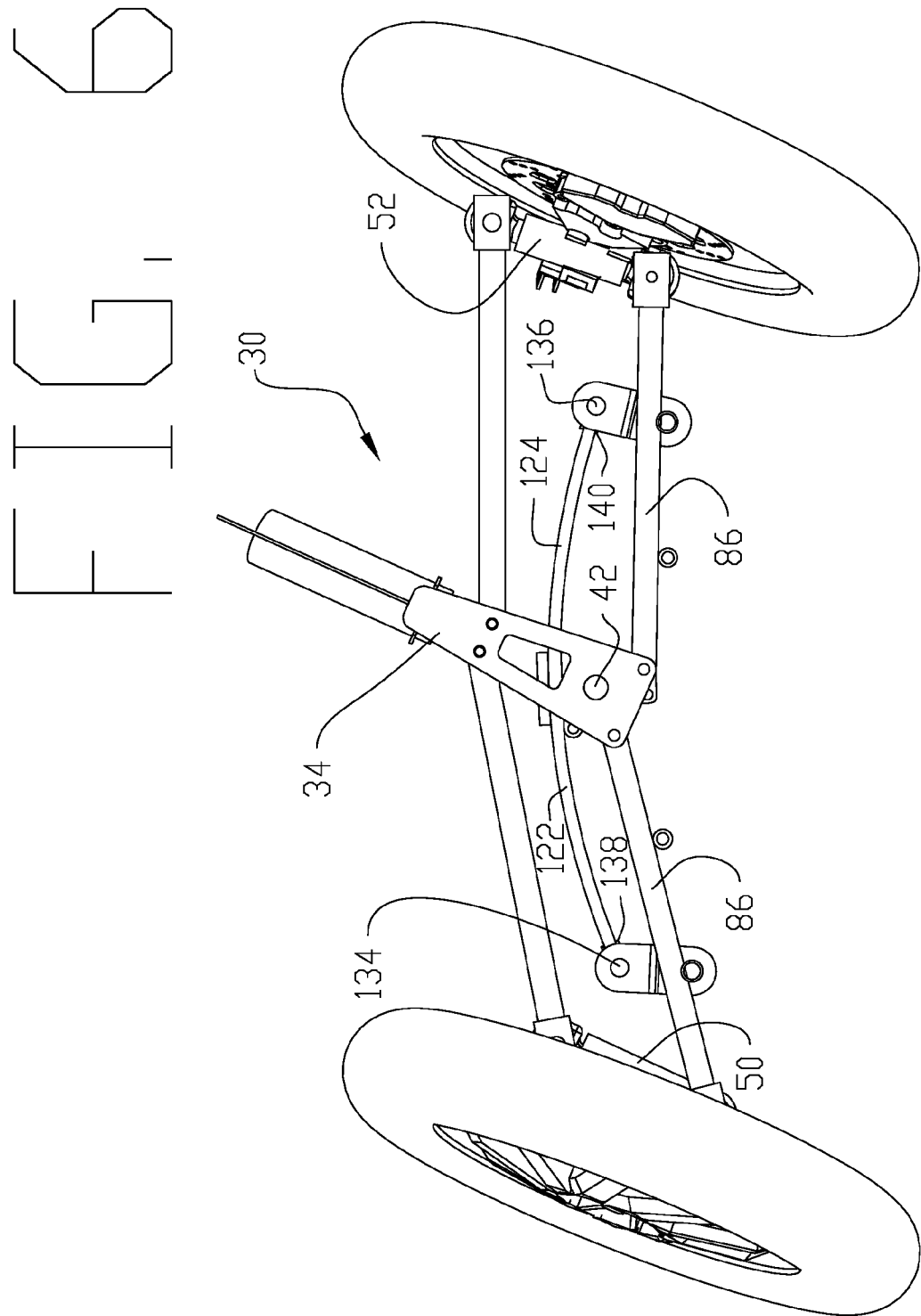
FIG. 6 is a front perspective view of the first embodiment of the present invention, similar to FIG. 3 but with some parts removed to show the transverse spring.

Suspension 30 includes a rocker member 38 and a pivot bearing 40 mounting rocker member 38 to the vehicle frame 34 as by large diameter hollow pivot bolt 42 fixedly attached to the frame 34 and about which rocker member 38 rotates, with well-known roller bearings 44 being pressed into both ends 46 of the bore 48 of rocker member 38 and with bolt 42 being coaxial with longitudinal axis 36 such that rocker member 38 is mounted for pivoting movement upon bolt 42 about longitudinal axis 36. It is essential that pivot bolt 42 provide a strong and rigid mount for pivoting movement of rocker member 38 thereabout, and this pivoting movement allows the vehicle to lean into corners as best seen in FIG. 3.

Suspension 30 further includes left and right wheel mounting members 50, 52 having left and right wheels 54, 56 mounted for rotation upon left and right wheel mounting members 50, 52. Left and right wheel mounting members 50, 52 are well-known and are often referred to as a "spindle" or "steering knuckle", and are preferable well-known Lager "T-Pin" spindles such as the Laeger Pro-Trax spindles, and the wheels rotate about left and right axles 58, 60. Wheel mounting members 50, 52 are also steerable about their respective axes 62, 64 in response to their respective left and right steering linkages 66, 68 that are coupled in a well-known manner to steering mechanism 70 to turn the wheels left and right to steer the vehicle in the well-known manner. Wheel mounting members 50, 52 must allow for considerable motion because the leaning capabilities of the suspension system require that the upper and lower pivots (typically ball-and-socket joints in traditional four-wheeled suspension systems) move through about 90 degrees of motion due to the fact that the vehicle leans 45 degrees or more to either side of vertical.

Figure 7:
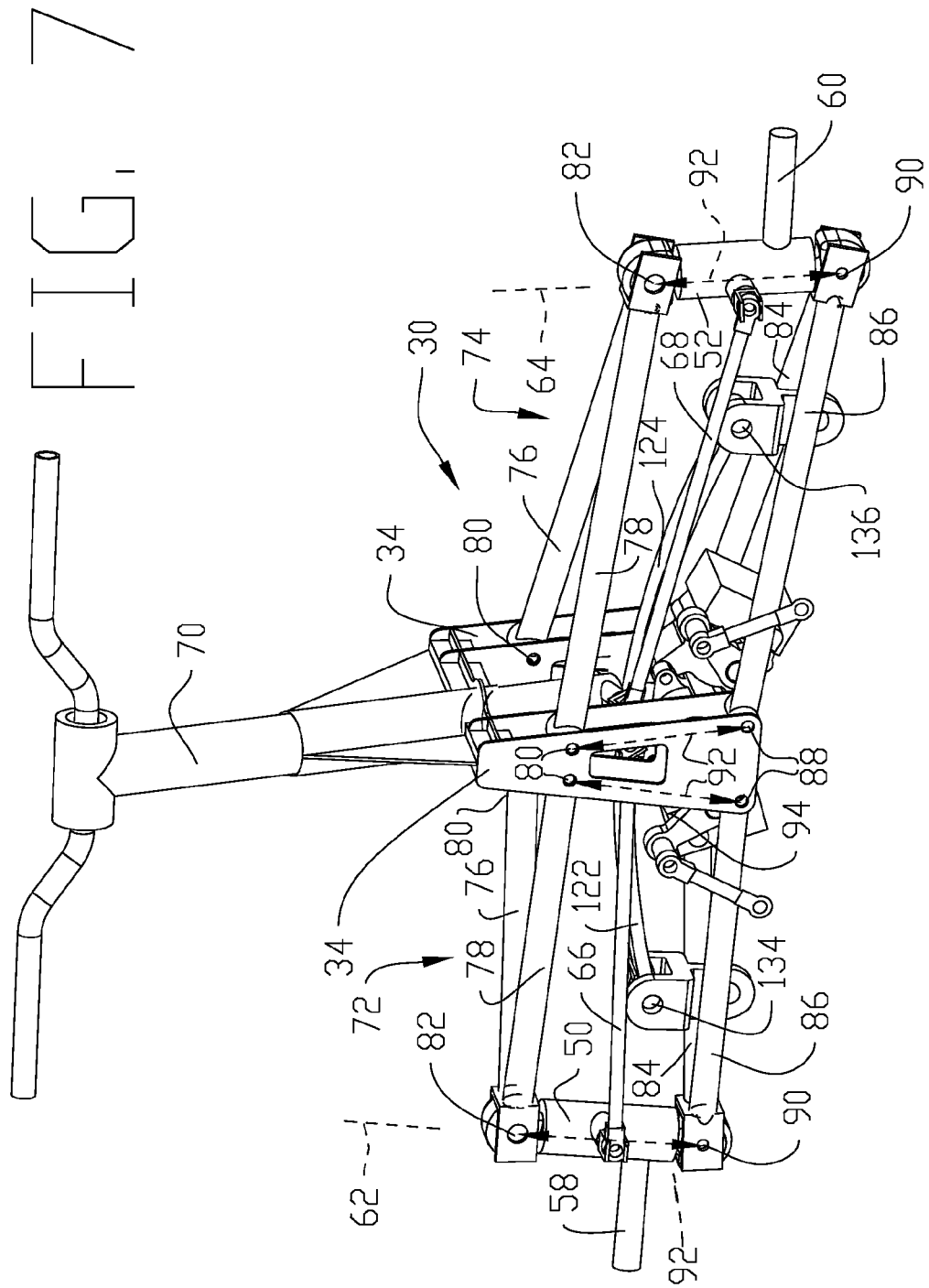
FIG. 7 is a rear perspective view of the first embodiment of the present invention, with some parts removed to better shown the steering linkage.
Figure 8:
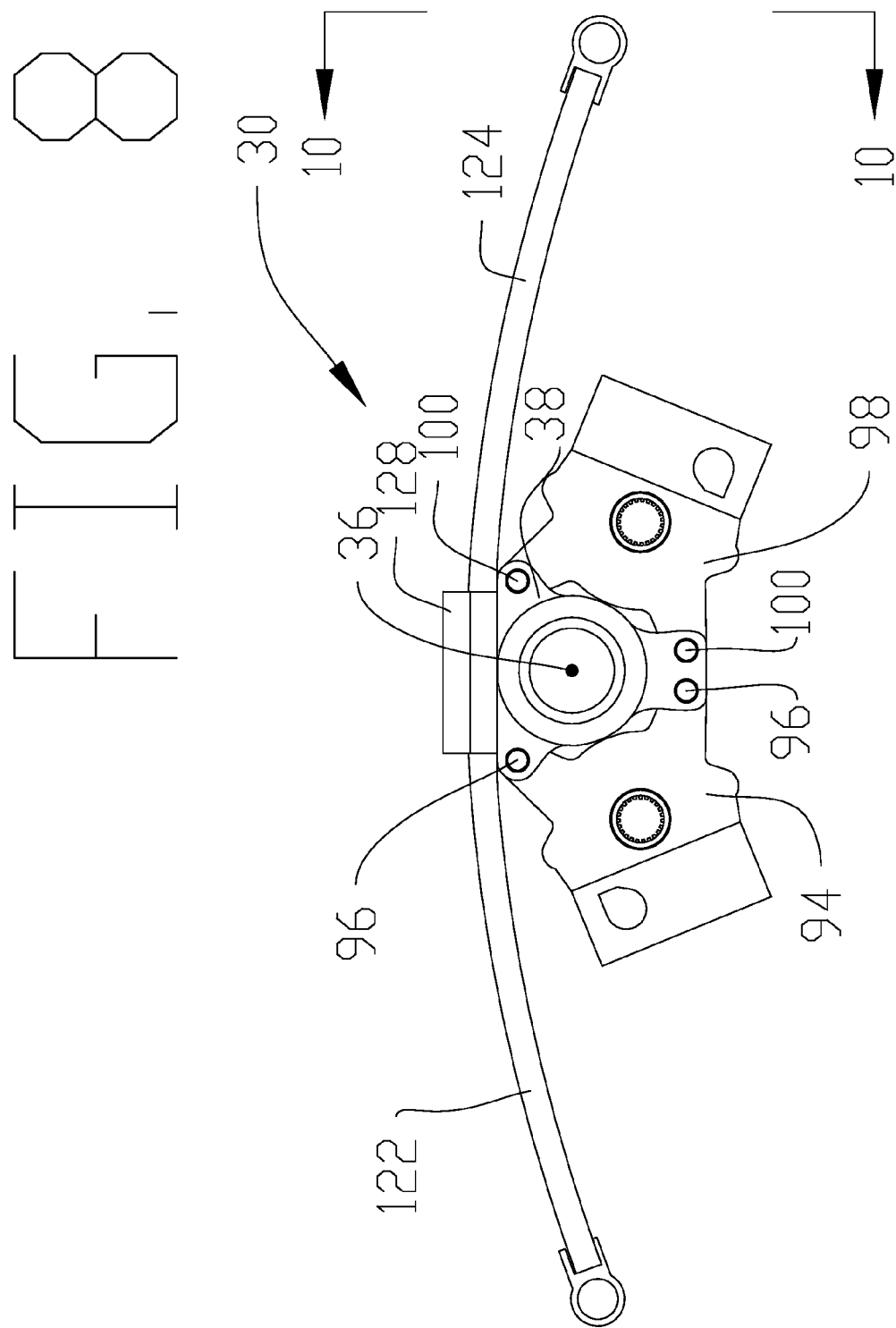
FIG. 8 is a rear view of the first embodiment of the present invention showing the mounting of the transverse spring and rotary dampers to the rocker member.

As best seen in FIG. 7, suspension 30 further has left control arm means 72 interposed between vehicle frame 34 and left wheel mounting member 50, and right control arm means 74 interposed between vehicle frame 34 and right wheel mounting member 52. Left and right control arm means 72, 74 are known as a "transversal control arm", "double wishbone", or "double A-arm" design, each having a first upper arm 76 and preferably second upper arm 78 pivotally mounted at a first end 80 thereof to vehicle frame 34 and pivotally mounted at a second end 82 to its respective wheel mounting member 50, 52, and each having a first lower arm 84 and preferably a second lower arm 86 pivotally mounted at a first end 88 thereof to vehicle frame 34 and pivotally mounted at a second end 90 to its respective wheel mounting member 50, 52. The upper arm(s) and lower arm(s) of each control arm means 72, 74 are respectively of substantially equal length (i.e., first upper arm 76 is of substantially the same length as first lower arm 84, and second upper arm 78 is substantially the same length as second lower arm 86), and the pivotal mounting of the first end 80 of the respective upper arm is spaced from the pivotal mounting of the first end 88 of its respective lower arm by a first distance 92 and the pivotal mounting of the second end 82 of the upper arm is substantially spaced from the pivotal mounting of the second end 90 of its respective lower arm by the same first distance 92, such that left and right control arm means 72, 74 each have a parallelogram geometry and are understood to permit left and right wheels 54, 56 to independently move up and down while maintaining a constant camber. The pivotal mounting of the ends of the upper and lower control arms should be of a low-friction type mounting, with "rod-end bearings" or "heim joints" being preferred over "plain bearings" or "bushings".

In both preferred embodiments 30 and 2.30, hereinafter described in detail, the mounting of the first ends 80 of the respective left and right upper arms to the vehicle's frame should be as close as possible to the vehicle's centerline so as to prevent "jacking" as the vehicle leans into corners. Likewise, in both preferred embodiments 30 and 2.30, hereinafter described in detail, the mounting of the first ends 88 of the respective left and right lower arms to the vehicle's frame should be as close as possible to the vehicle's centerline, also so as to prevent "jacking" as the vehicle leans into corners. The substantial difference between the first and second embodiments 30 and 2.30 is that, in the second preferred embodiment 2.30 of the suspension, first ends 80 of left and right upper arms are pivotally mounted to the vehicle's frame coaxially to each other and on the vehicle's centerline, and likewise, first ends 88 of left and right lower arms are pivotally mounted to the vehicle's frame coaxially to each other and on the vehicle's centerline, thereby preventing "jacking" of the vehicle as it leans into corners.

Figure 13:
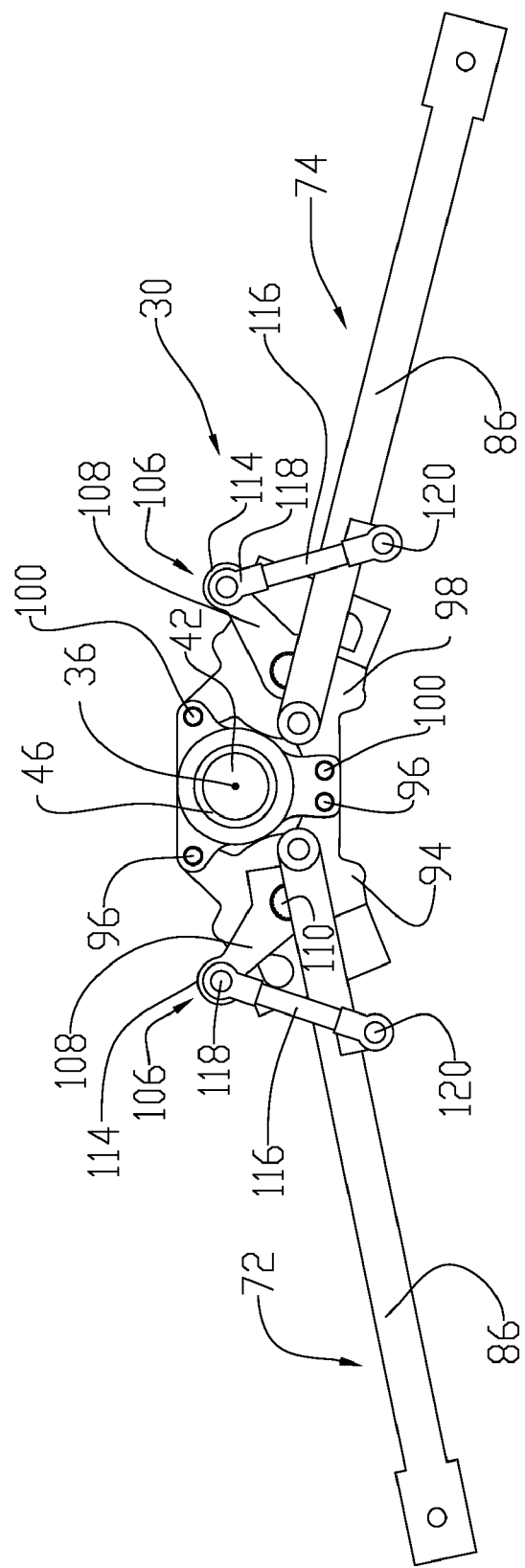
FIG. 13 is a rear view of the first embodiment of the present invention with some parts removed to show the coupling of the rotary dampers to the lower arms of the control arm means.
Figure 14:
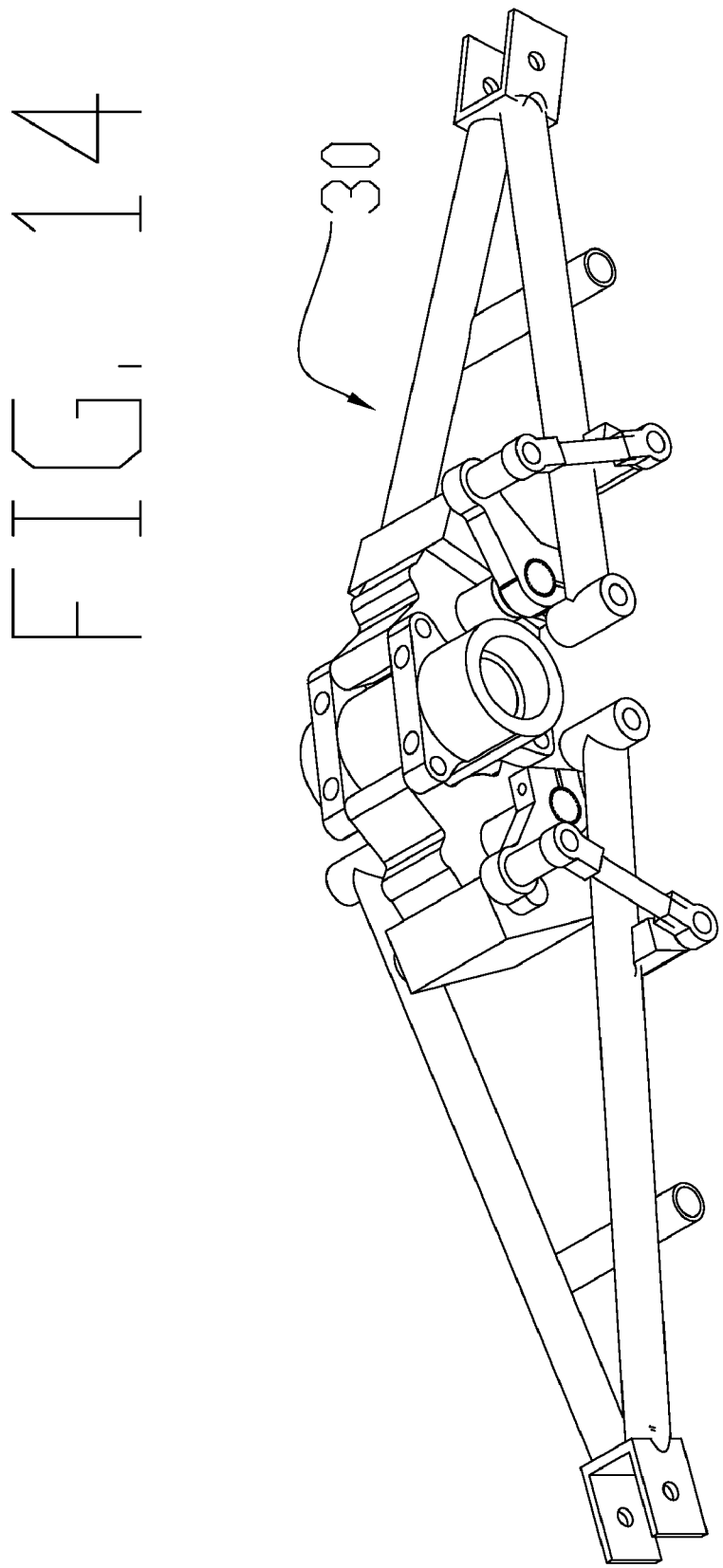
FIG. 14 is a perspective view of the first embodiment of the present invention with some parts removed to show the coupling of the rotary dampers to the lower arms of the control arm means, similar to FIG. 13 but in perspective from a different angle.
Figure 15:
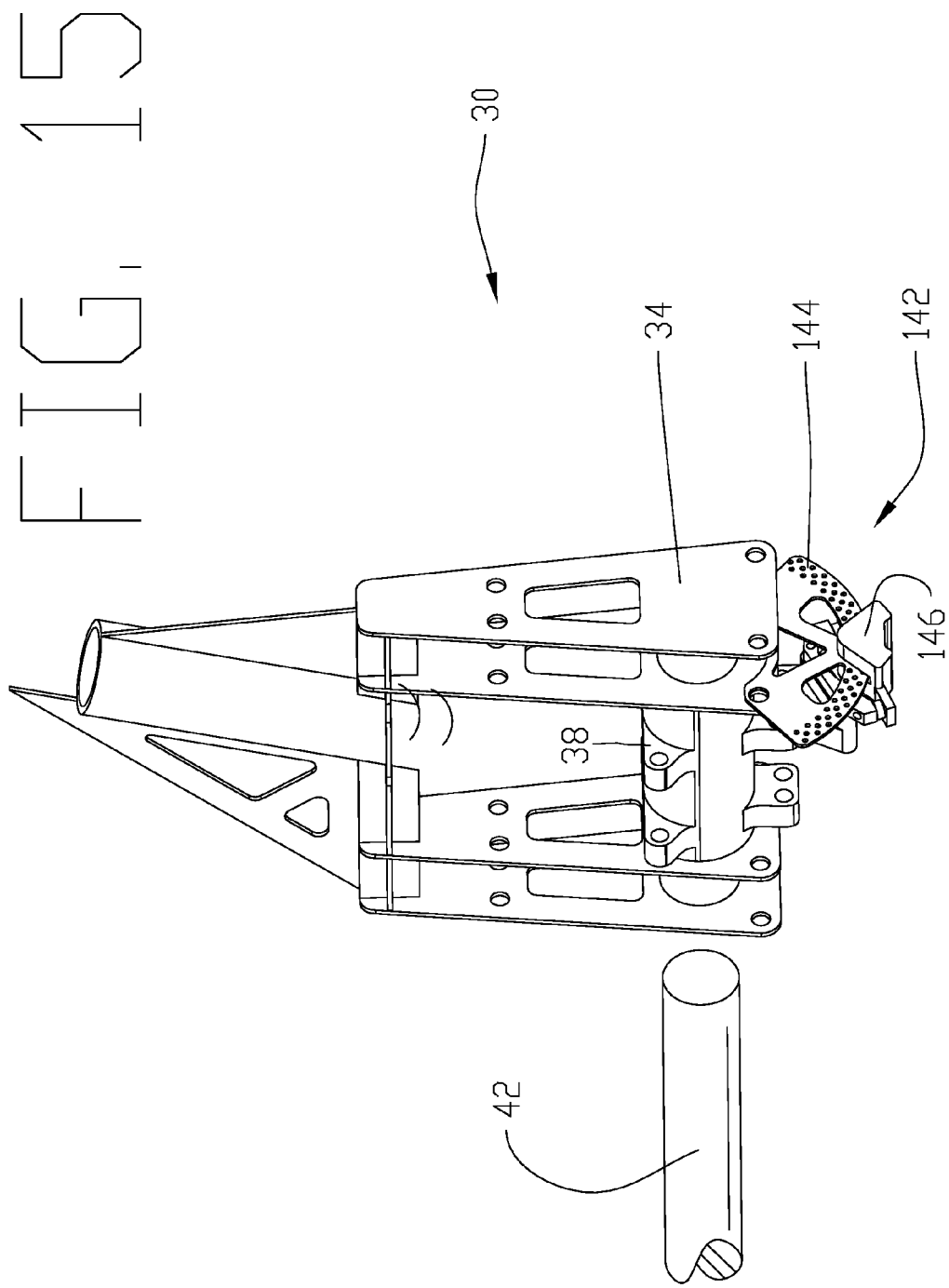
FIG. 15 is a perspective view of the lean brake means of the first embodiment of the present invention with some parts removed to show mounting to the rocker member.
Figure 16:
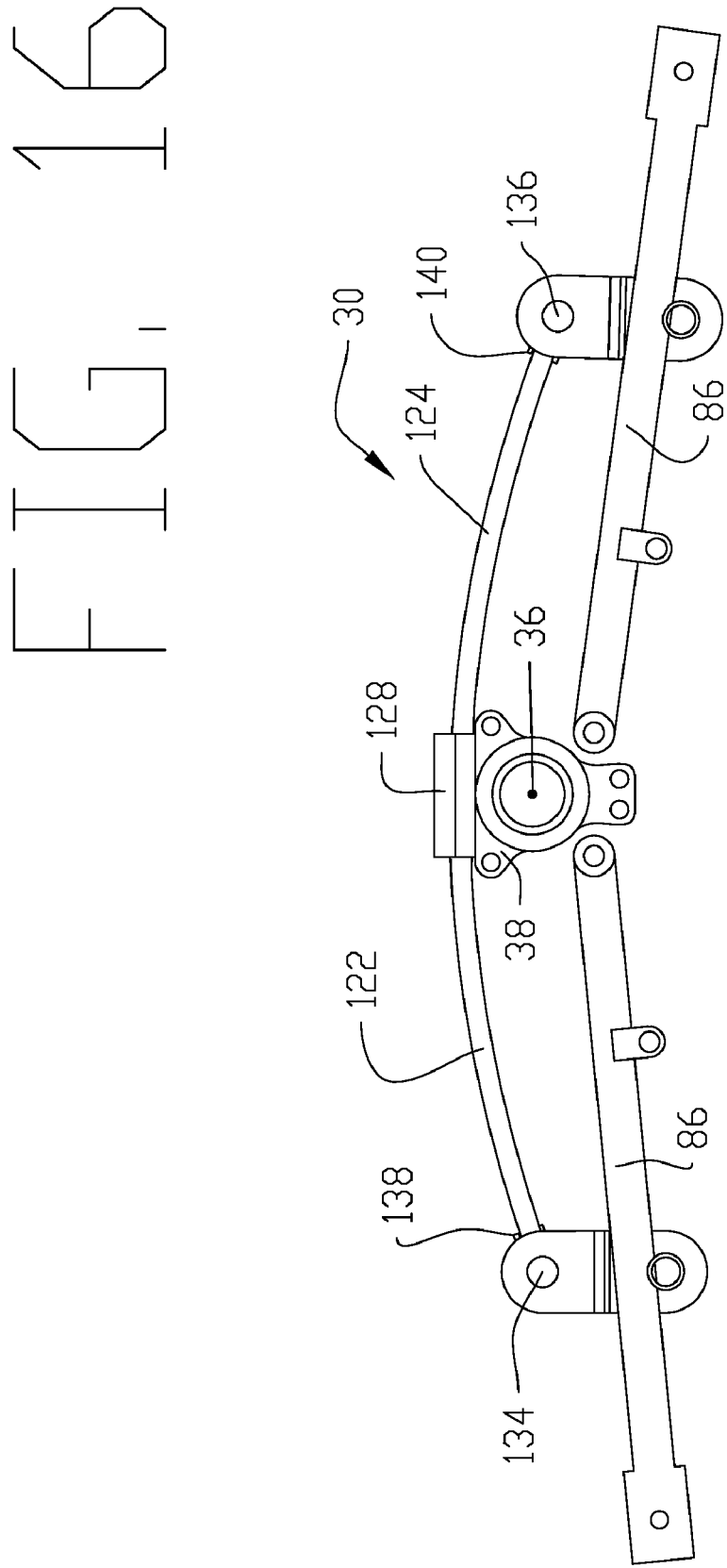
FIG. 16 is a rear view of the first embodiment of the present invention, similar to FIG. 8, but showing the mounting of the transverse spring to the rocker member and to the lower arms of the control arm means.
Figure 17:
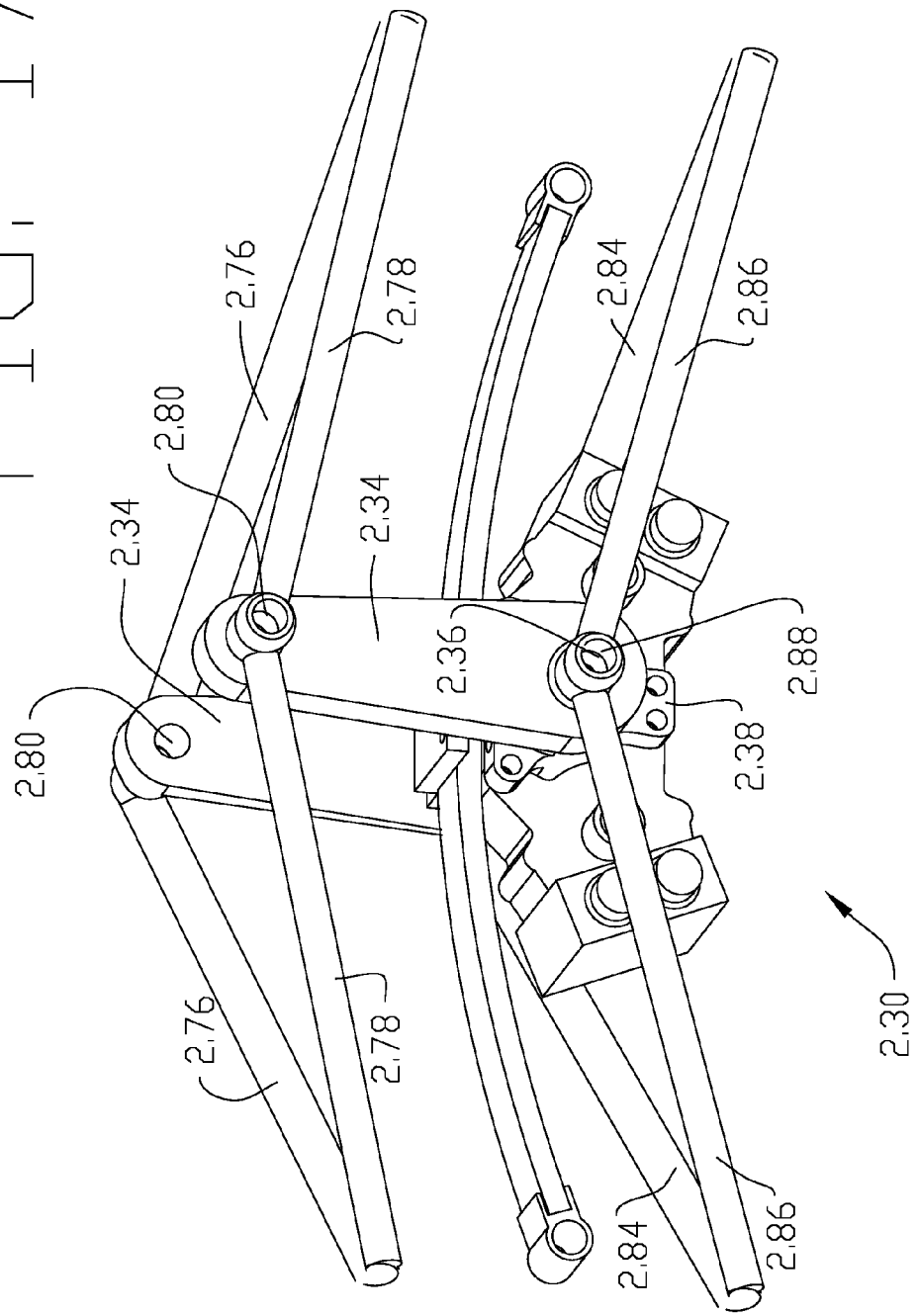
FIG. 17 is a perspective view of the second embodiment of the present invention with some parts removed to show the coaxial mounting of the upper and lower control arms to the vehicle's frame.
Figure 18:
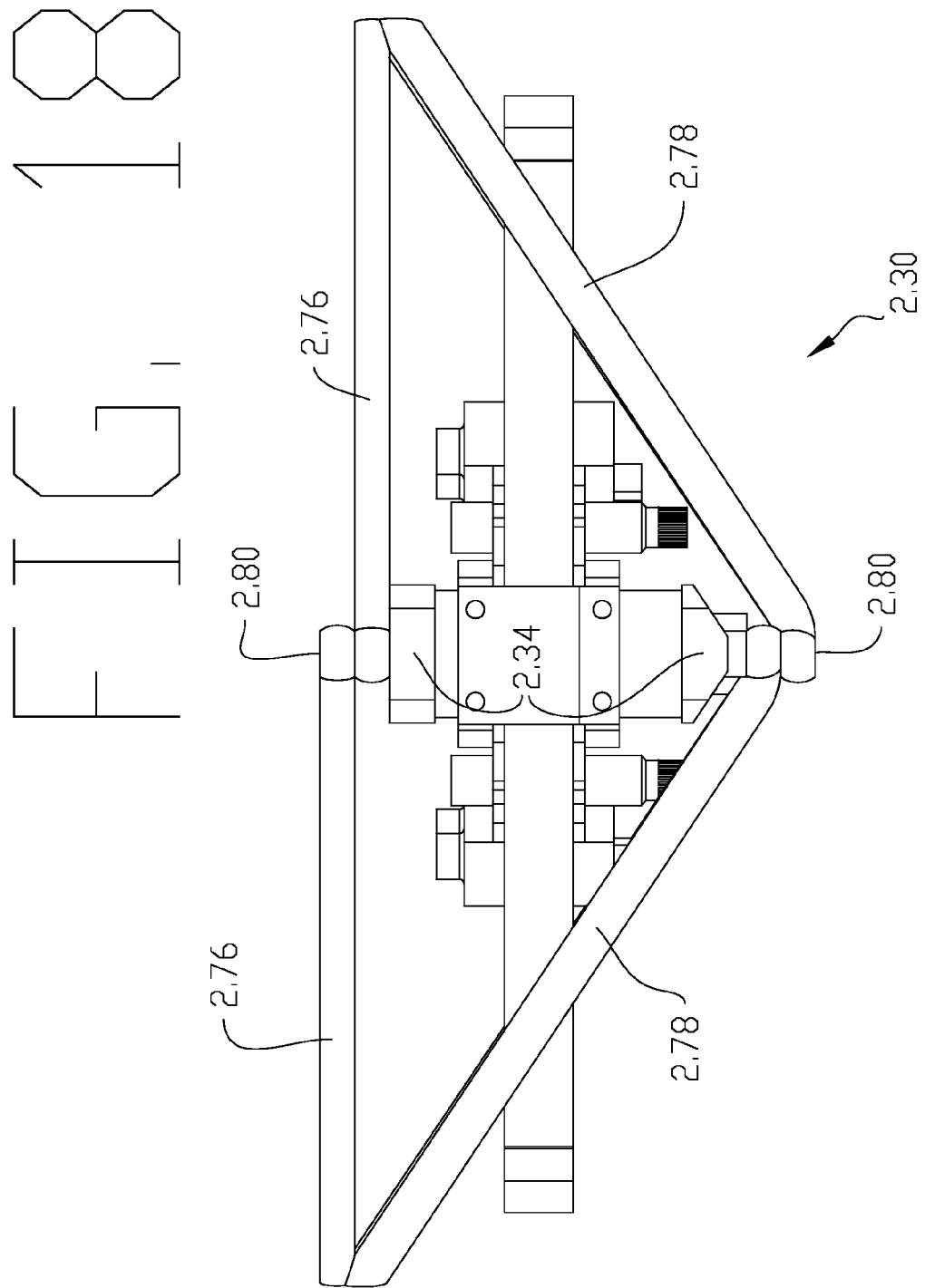
FIG. 18 is a top view of the second embodiment of the present invention with some parts removed to show the coaxial mounting of the upper and lower control arms to the vehicle's frame.
Figure 19:
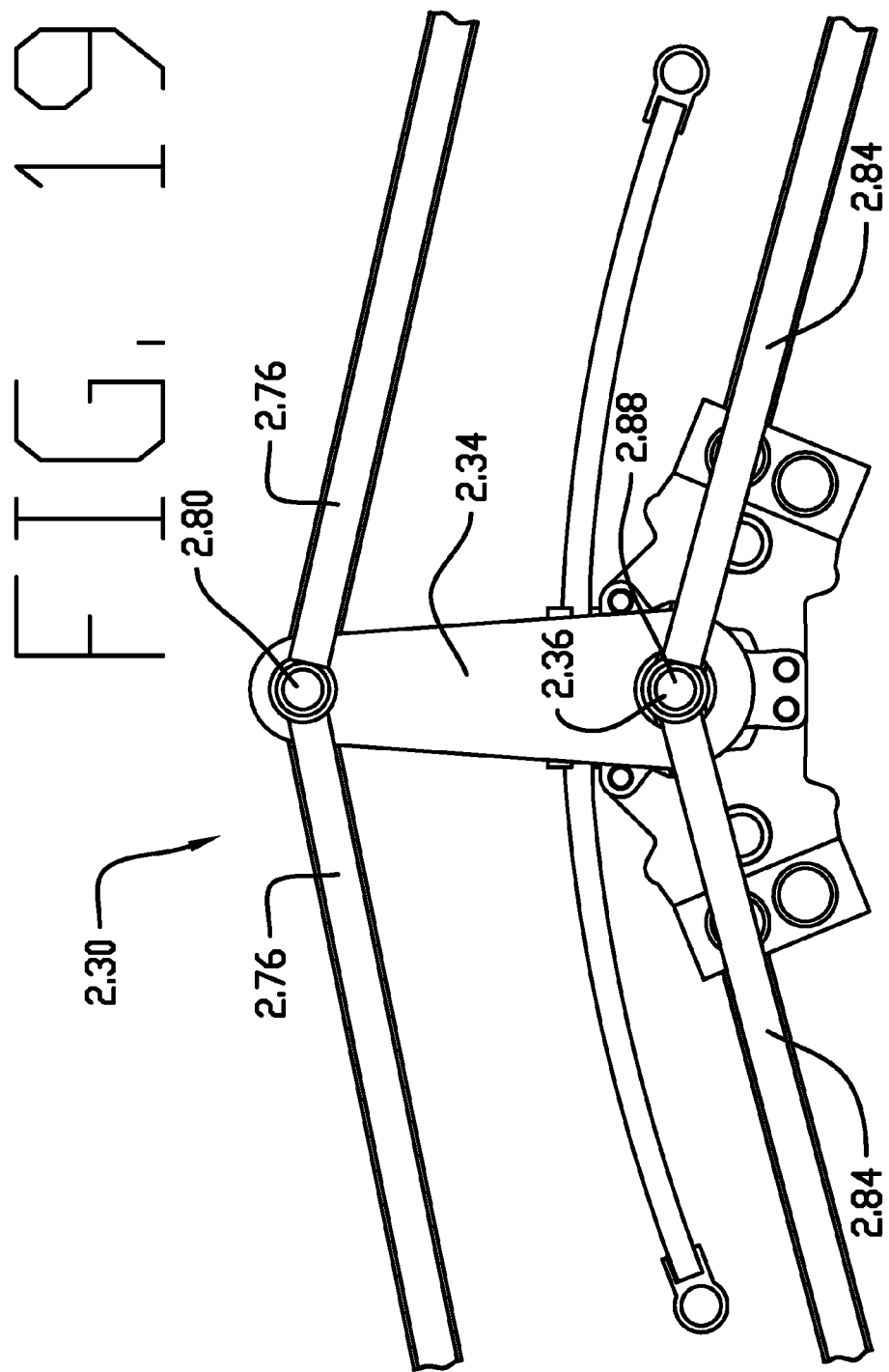
FIG. 19 is a front view of the second embodiment of the present invention with some detail added to show the coaxial mounting of the upper and lower control arms to the vehicle's frame.
Figure 20:
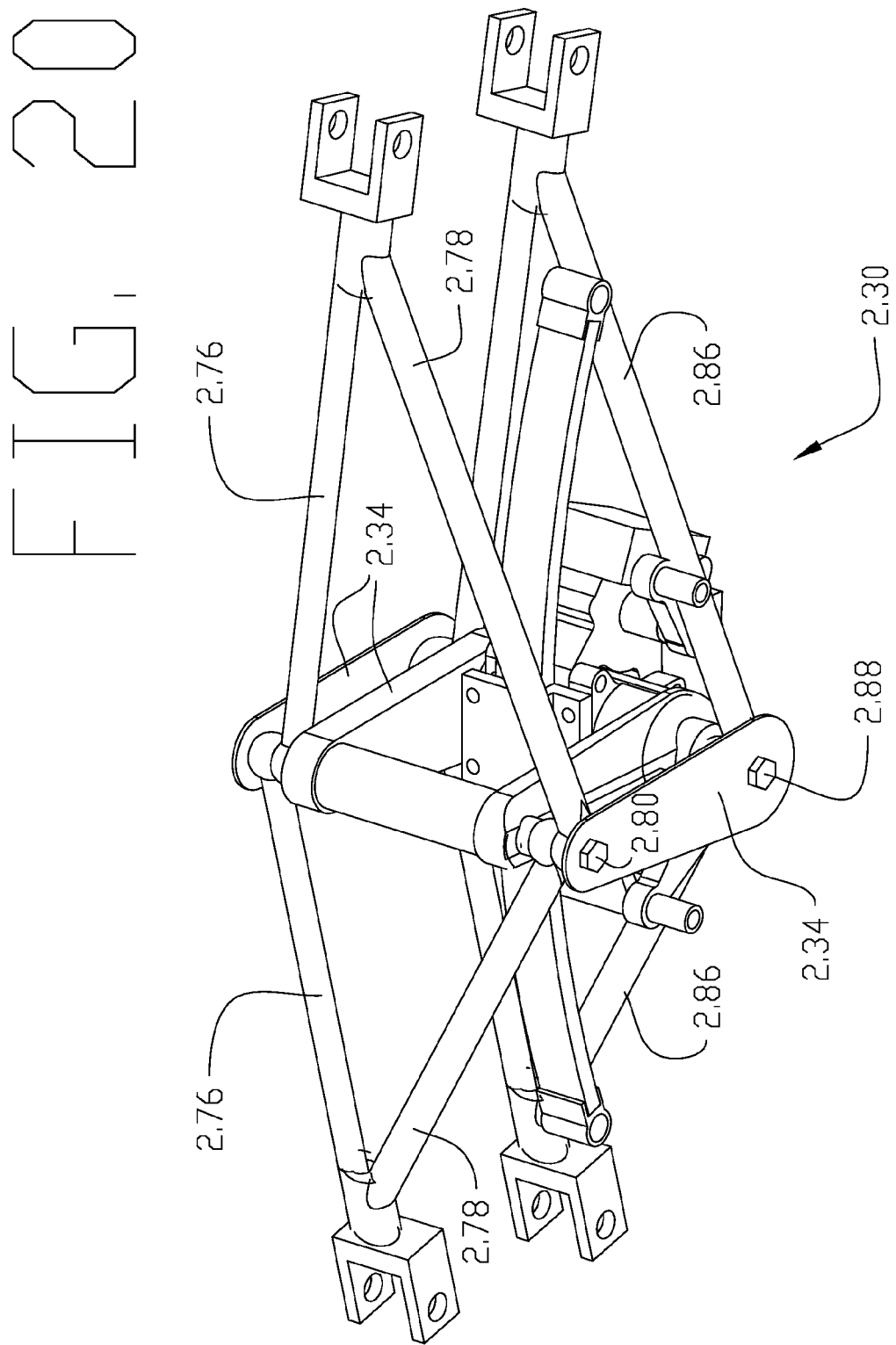
FIG. 20 is a rear perspective view of the second embodiment of the present invention with some parts removed to show the coaxial mounting of the upper and lower control arms to the vehicle's frame.
Figure 21:
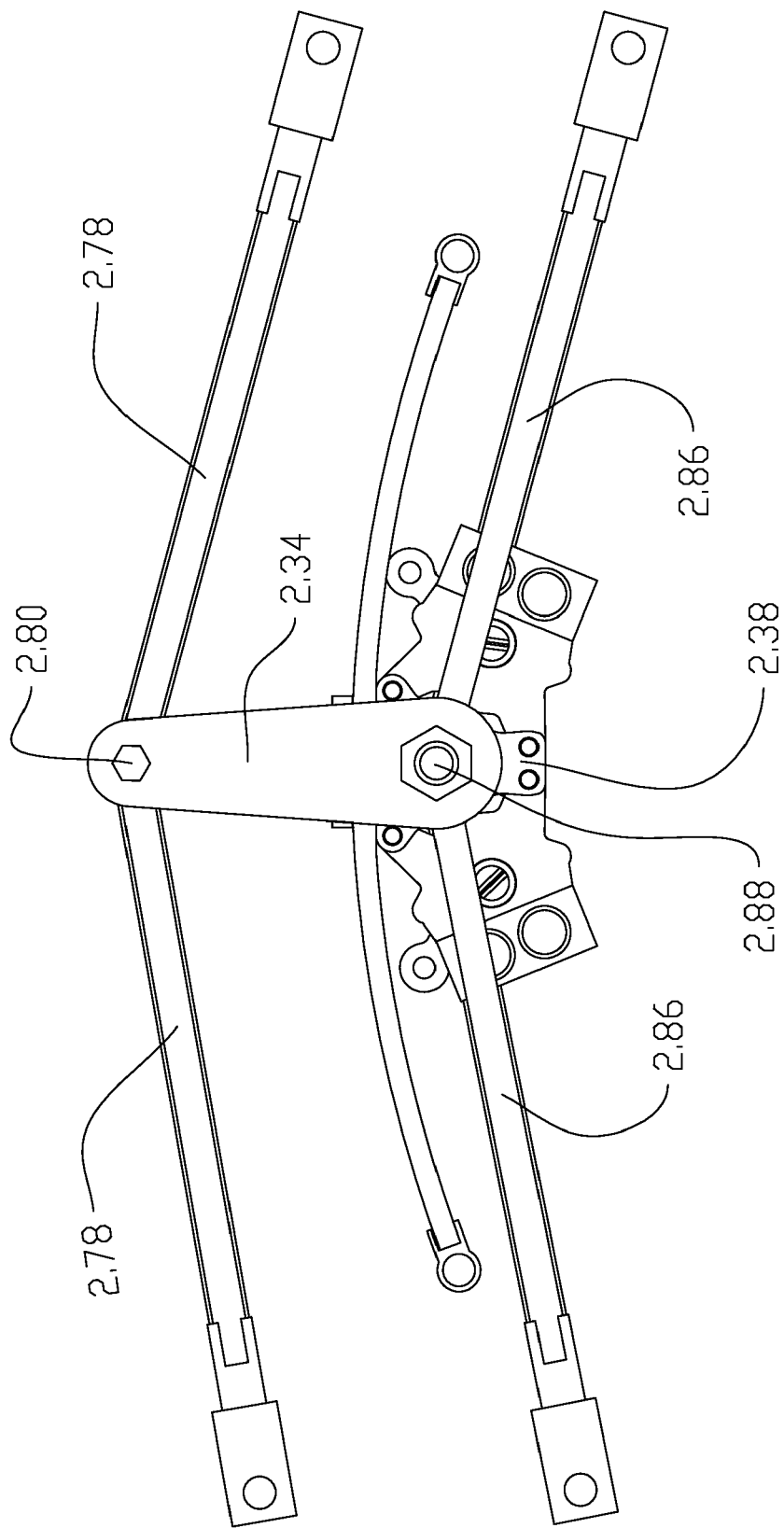
FIG. 21 is another front view of the second embodiment of the present invention, similar to FIG. 19 with some detail added to show the coaxial mounting of the upper and lower control arms to the vehicle's frame.
Figure 22:
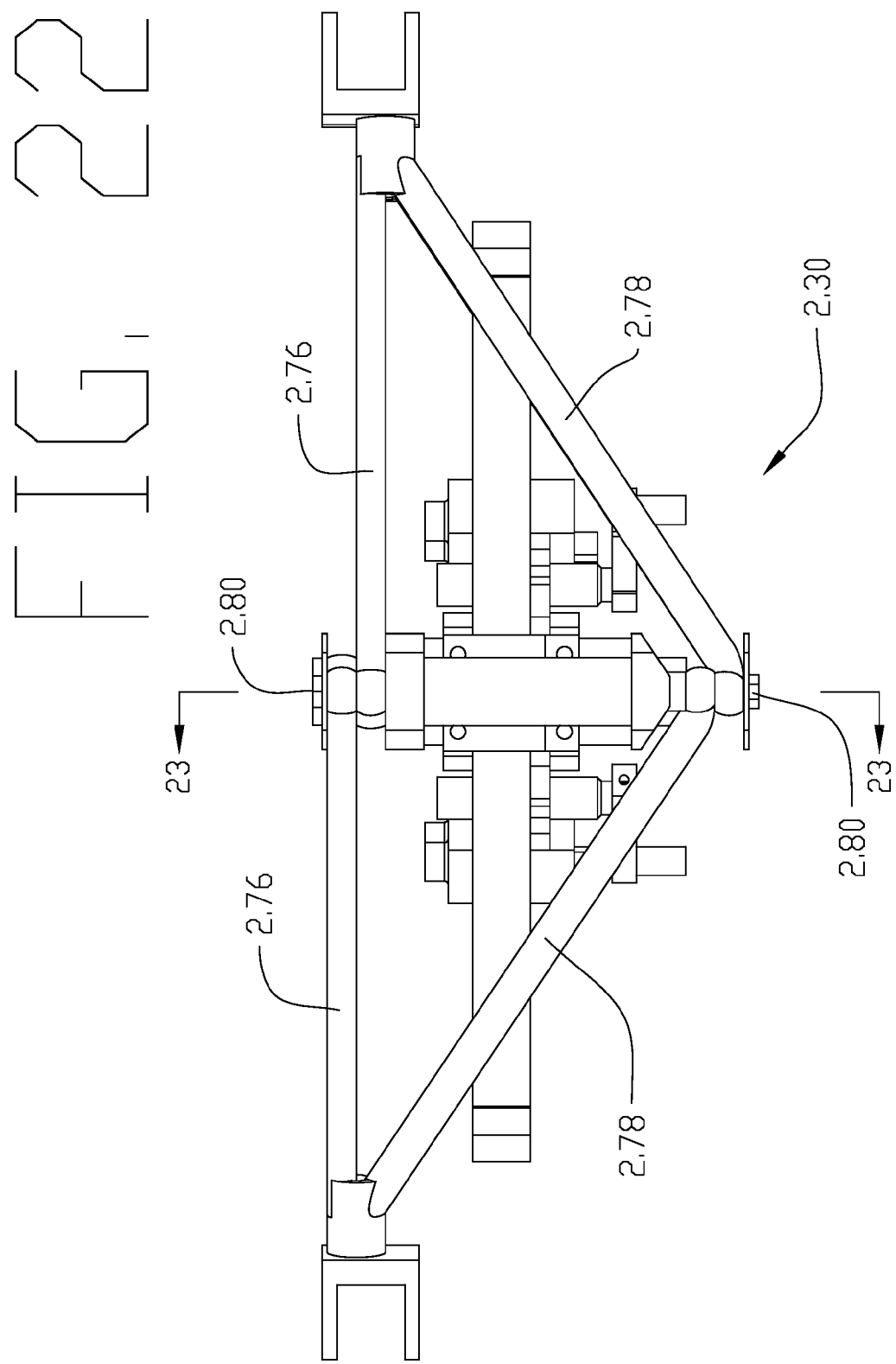
FIG. 22 is another top view of the second embodiment of the present invention, similar to FIG. 18 with some detail added to show the coaxial mounting of the upper and lower control arms to the vehicle's frame.
Figure 23:
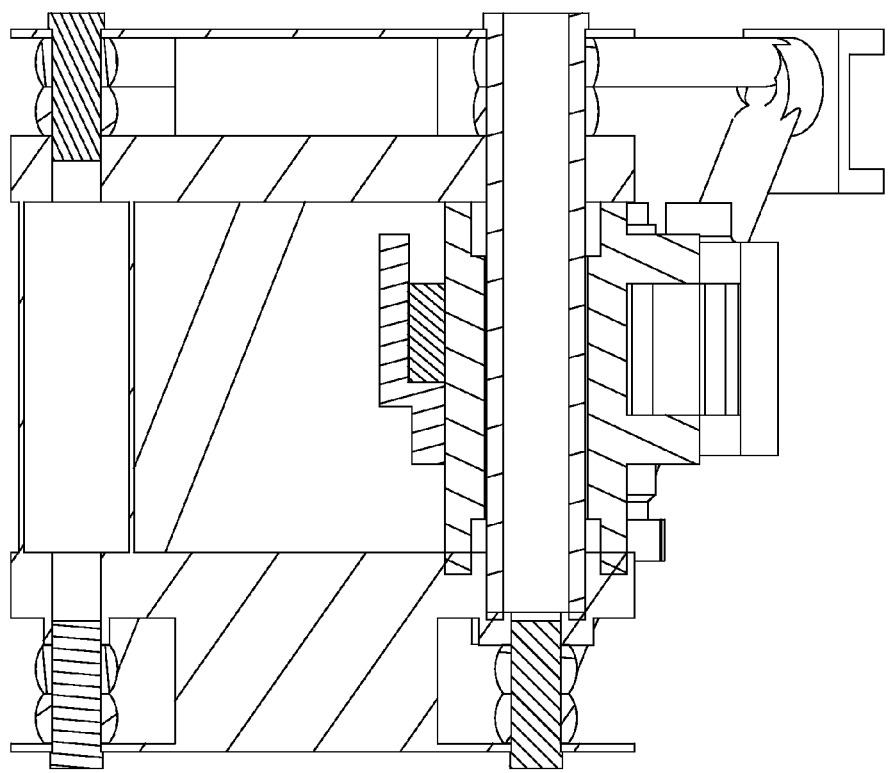
FIG. 23 is a sectional view of the second embodiment of the present invention, taken along the line 23-23 shown in FIG. 22.
Figure 24:
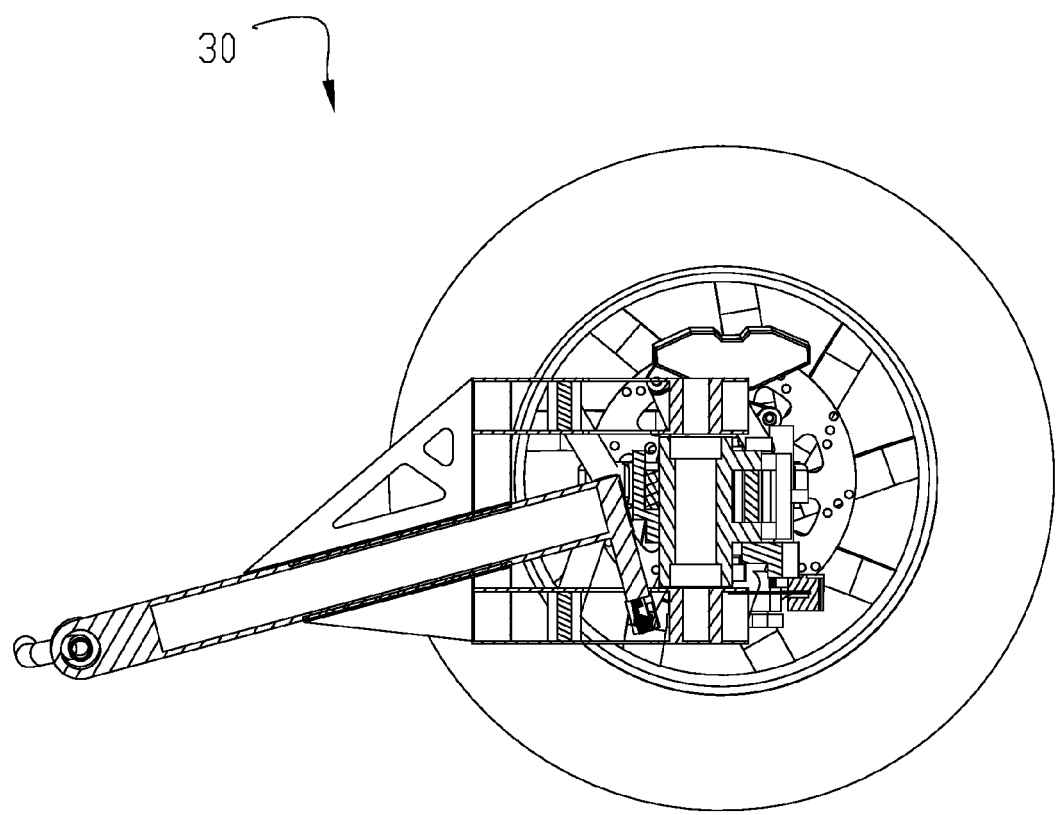
FIG. 24 is a sectional view of the first embodiment of the present invention, taken along the line 24-24 shown in FIG. 1.
Figure 25:
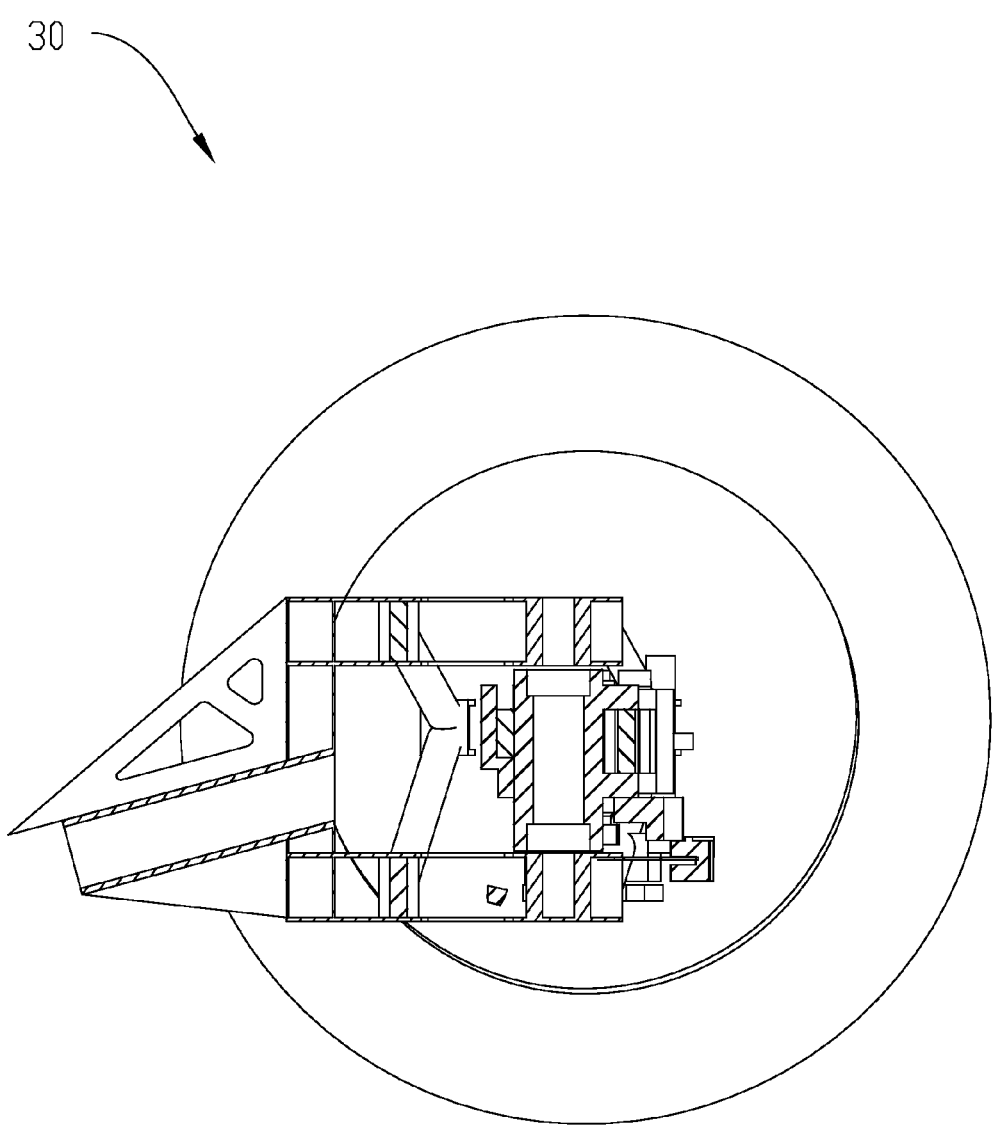
FIG. 25 is a sectional view of the first embodiment of the present invention, taken along the line 25-25 shown in FIG. 1, with certain steering component parts removed for clarity.
Figure 26:
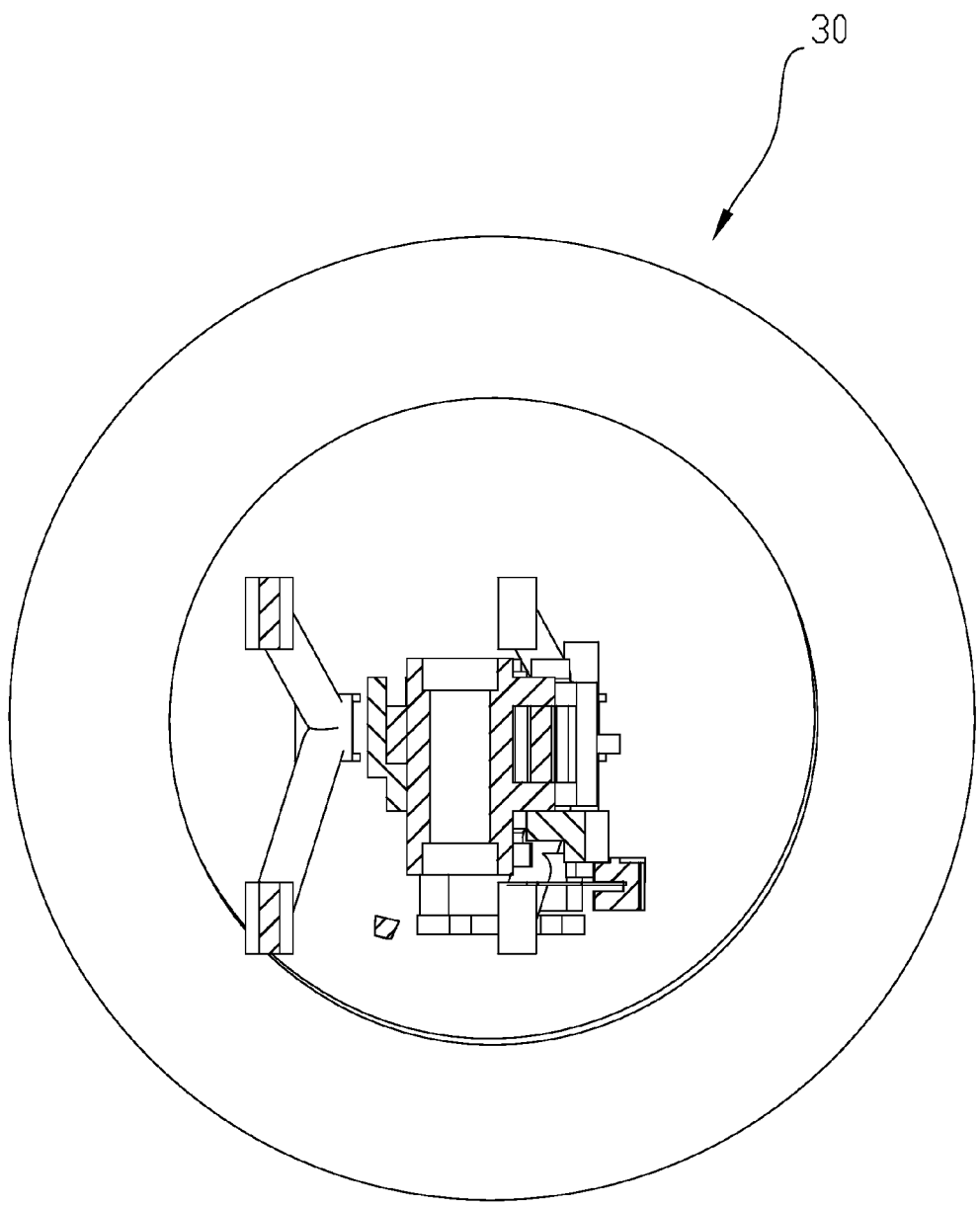
FIG. 26 is a sectional view of the first embodiment of the present invention, taken along the line 26-26 shown in FIG. 1, with certain steering component parts removed for clarity.

As seen best in FIGS. 7 and 13, suspension 30 further includes a left rotary damper 94 mounted to rocker member 38 as by bolts 96 and operably coupled to one of the upper or lower arms of the left control arm means, and preferably to the rear lower arm 86 of left control arm means 72. Likewise, suspension 30 further includes a right rotary damper 98 mounted to rocker member 38 as by bolts 100 and operably coupled to one of the upper or lower arms of the right control arm means, and preferably to the rear lower arm 86 of right control arm means 74.

Left and right rotary dampers 94, 98 are substantially the same and a description of the mounting and operation of one will suffice for both. These rotary dampers are well-known and preferably are Kayaba brand dampers as found on the Suzuki TL-1000 motorcycle produced from 1997 to 2003. These dampers have a main housing with damping circuits adjustable for motion in compression (when the left or right wheel moves upward as happens when the wheel hits a bump) and in rebound (as happens when the wheel moves down). Fluid is pumped through circuits in a well-known manner by vanes 102 (see FIG. 9) as the main shaft 104 is rotated by a linkage 106 that operably couples the rotary damper 94, 98 to its respective arm 86.

Figure 9:
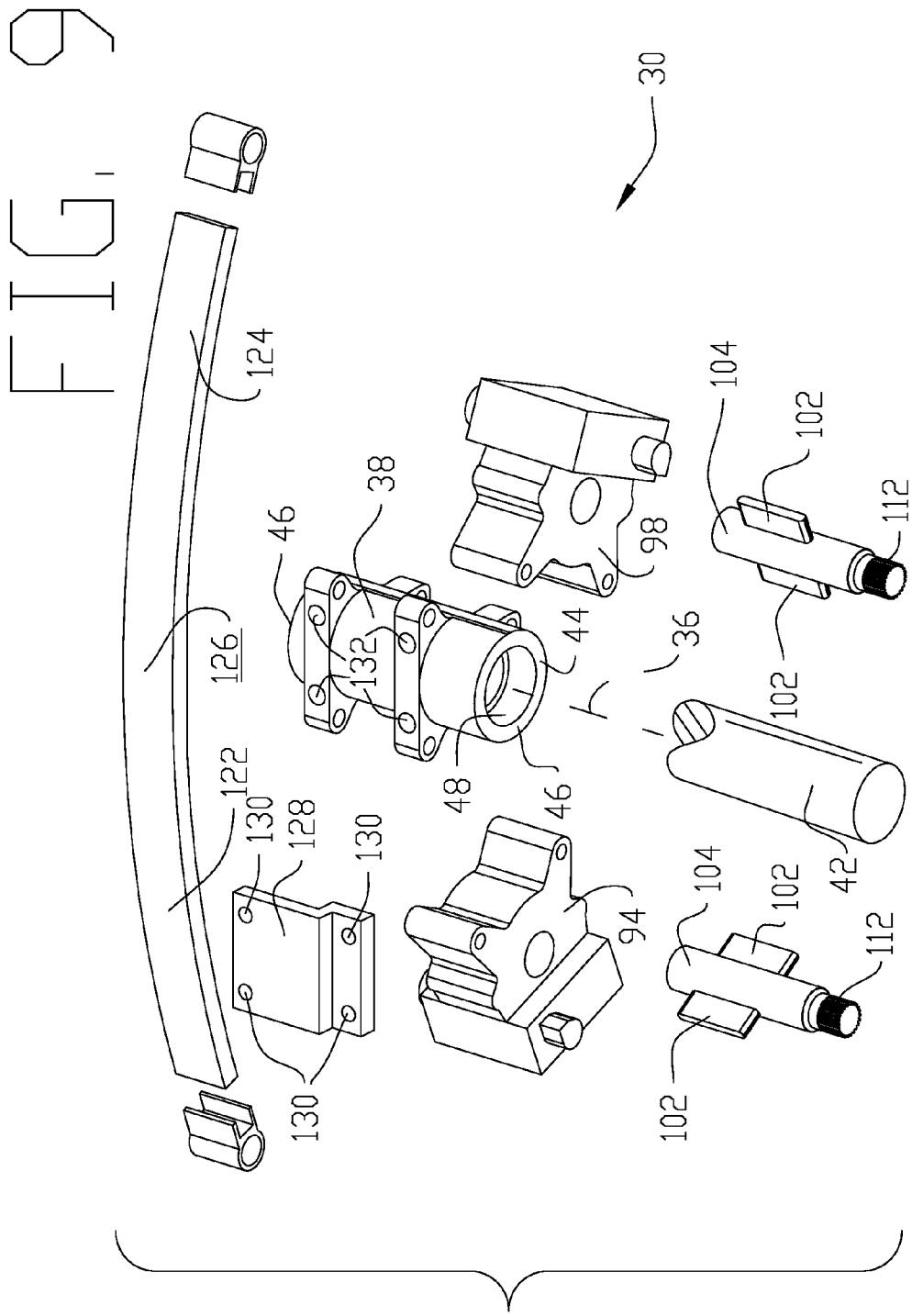
FIG. 9 is an exploded perspective parts view of the parts shown in FIG. 8, with the shafts and vanes of the rotary dampers removed for purposes of explanation.
Figure 10:
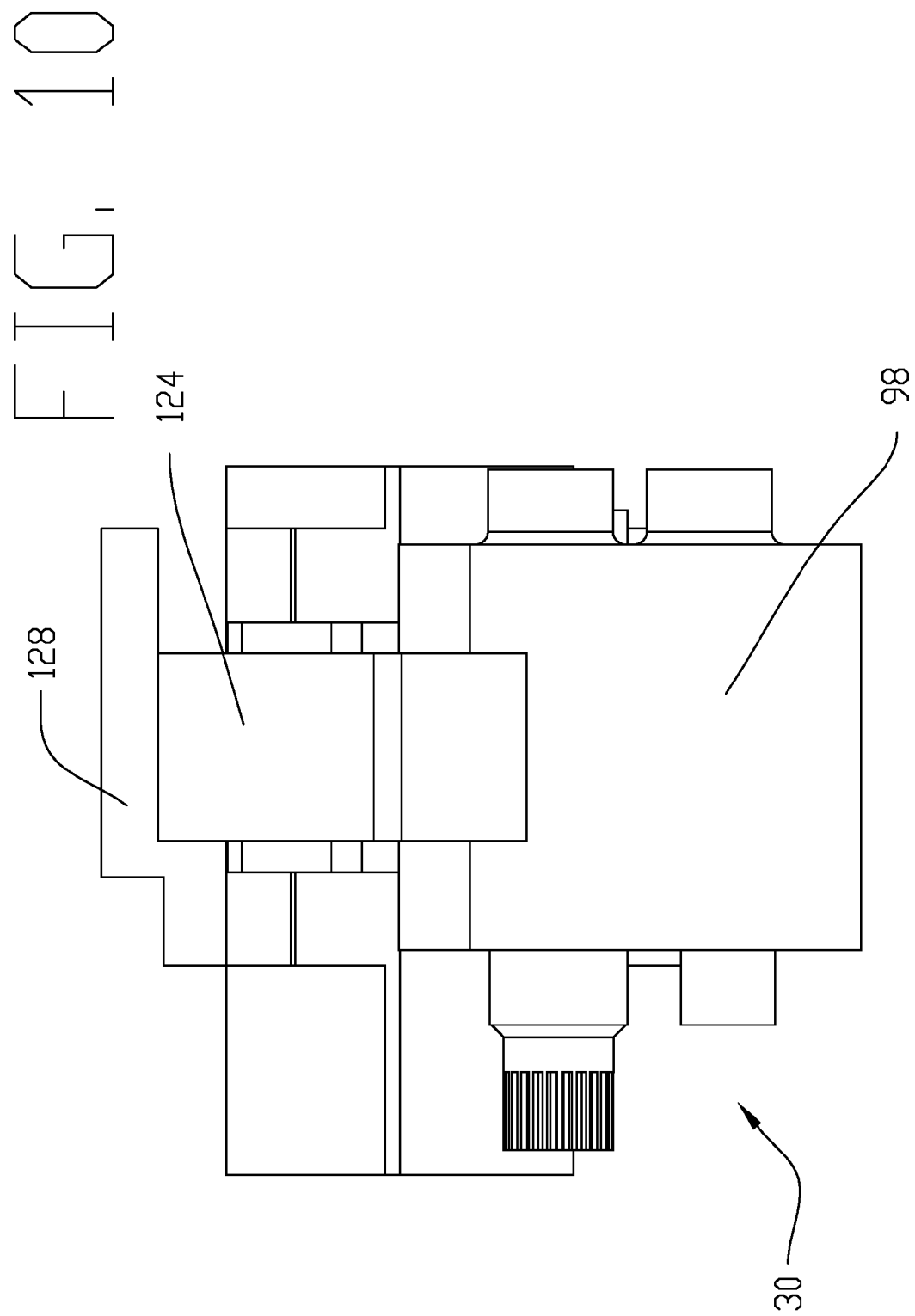
FIG. 10 is a side view showing the mounting of the transverse spring and rotary damper to the rocker member, taken substantially along the line 10-10 shown in FIG. 8.
Figure 11:
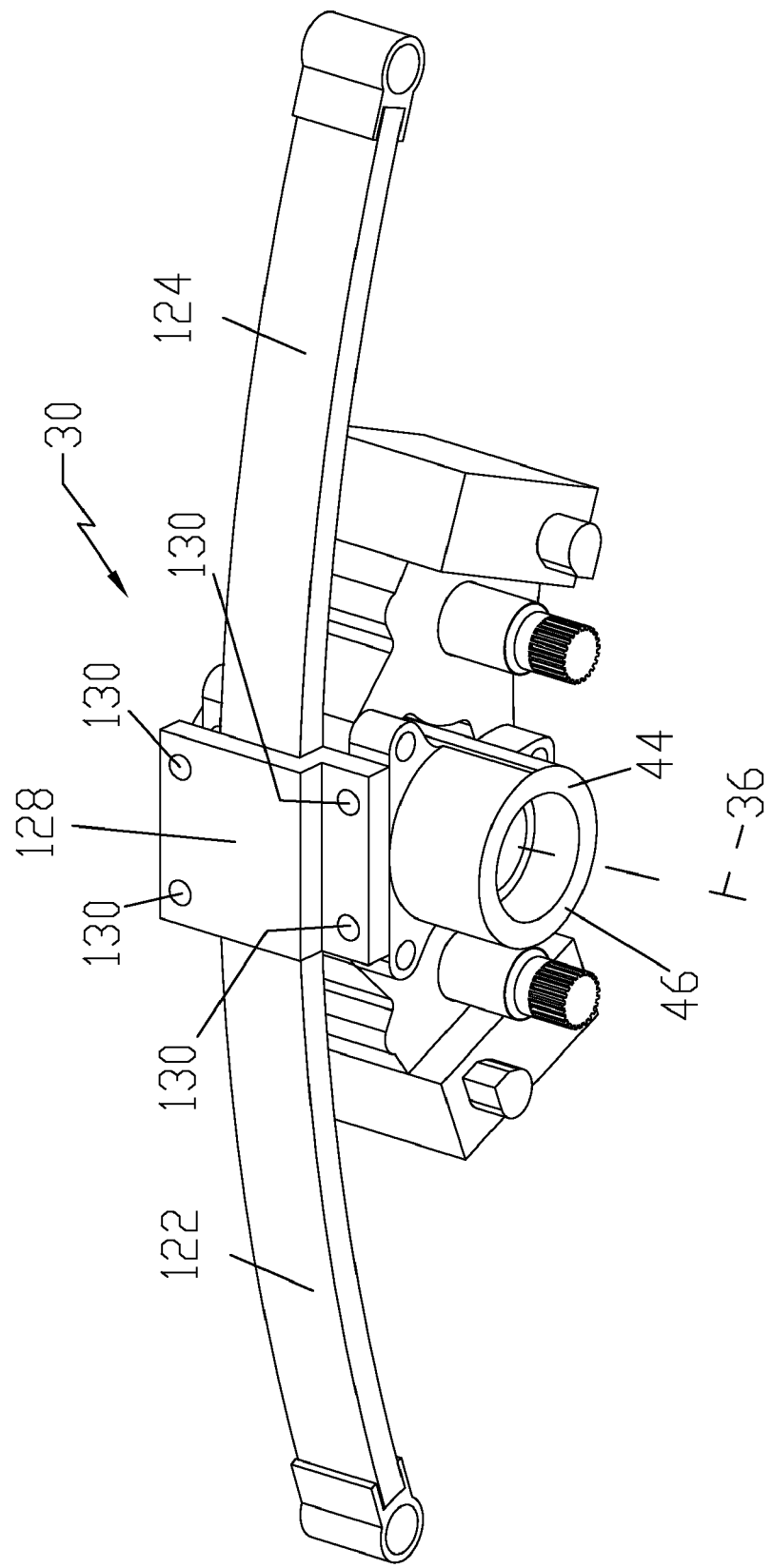
FIG. 11 is a perspective view showing the mounting of the transverse spring and rotary dampers to the rocker member, similar to FIG. 8 but in perspective from a different angle.
Figure 12:
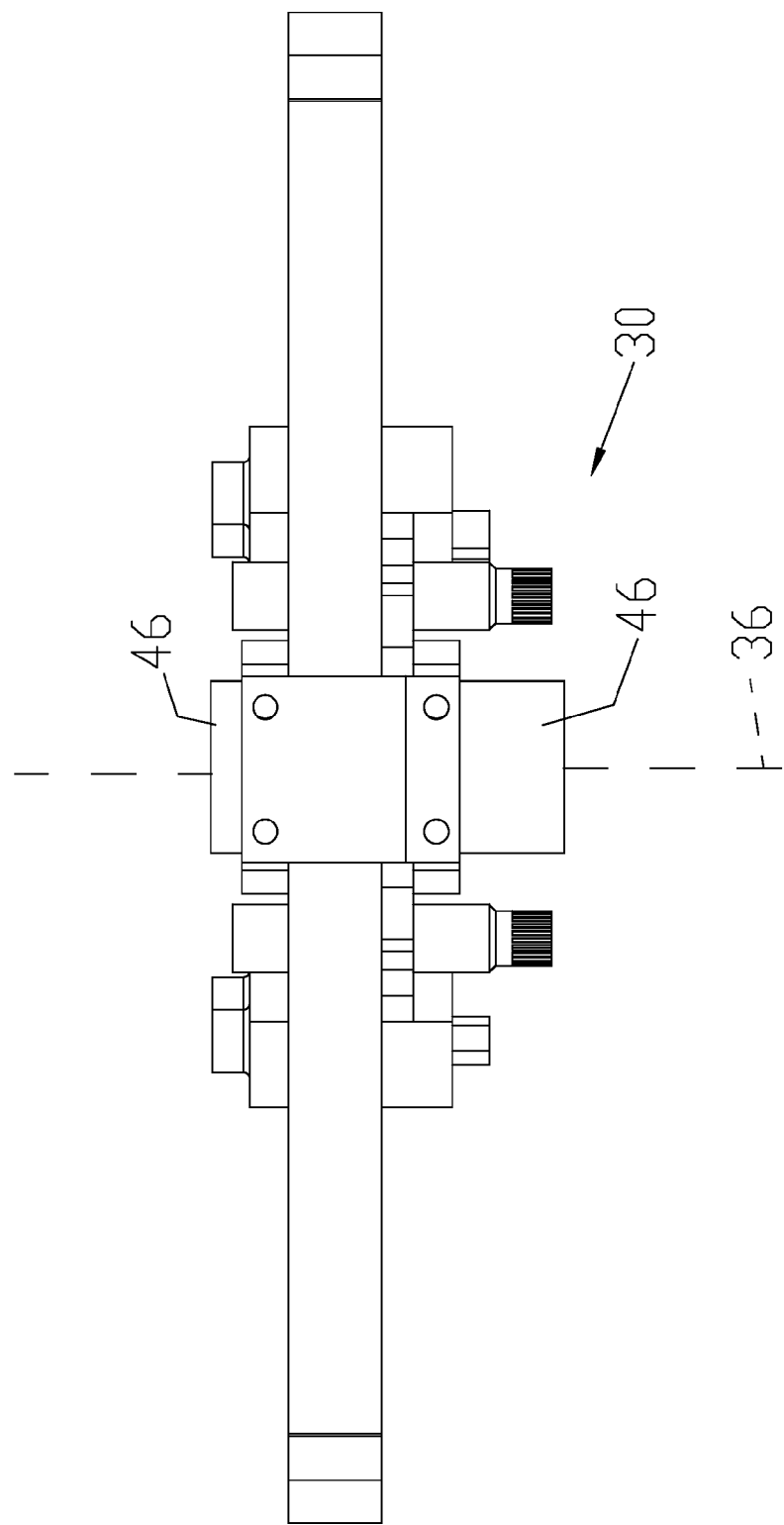
FIG. 12 is a top view showing the mounting of the transverse spring and rotary dampers to the rocker member, similar to FIG. 8 but viewed from the top.

As best seen in FIGS. 9 and 13, the operable coupling of rotary damper 94, 96 to its respective arm 86 is preferably by means of a rotary damper arm 108 received at a first end 110 onto splines 112 of shaft 104, and with rotary damper arm 108 having a second end 114. Second end 114 is operably coupled to arm 86 by a rotary damper connecting link 116 that is pivotally coupled at a first end 118 to end 114 of rotary damper arm 108 and that is pivotally coupled at a second end 120 to arm 86. It shall be understood that lengthening or shortening the length of rotary damper arm 108 changes the overall damping leverage ratio of the damping applied by rotary dampers 94, 98. Placement the pivotal coupling of end 120 along arm 86 is critical to vehicle handling so that the rotary dampers are not activated during vehicle lean and so that the rotary dampers are only activated in response to up and down movement of the wheels. If the rotary dampers were to be activated during vehicle lean, the vehicle's handling could become "sluggish", thereby resulting in a degradation of control of the vehicle by the operator/rider.

As best seen in FIGS. 1, 8, 9, and 11, suspension 30 further includes a left transverse leaf spring arm 122 and a right transverse leaf spring arm 124 mounted to rocker member 38 for independent spring action of left and right transverse leaf spring arms 122, 124. While left and right transverse leaf spring arms 122, 124 may be separate, they preferably are left and right halves of a single integrated composite, either fiberglass or carbon fiber, mono-leaf spring 126 (as contrasted with a multi-leaf steel spring) fixedly mounted at its center to rocker member 38 by clamp bracket 128 with well-known bolts through holes 130 and threadedly received into holes 132 of rocker member 38. Thus mounted to rocker member 38, left and right transverse leaf spring arms 122, 124 are operably coupled to one of their respective upper and lower arms 76, 78, 84, 86 of their respective left and right control arm means 72, 74, preferably as by a pivotal mounting 134, 136 of the outer ends 138, 140 of left and right transverse leaf spring arms 122, 124 to rear lower arms 86 of each respective left and right control arm means 72, 74. It should be noted that adjusting the distance of pivotal mounting 134 above lower arm 86 provides an overall vehicle ride-height adjustment, and also provides for a lower wheel spring rate at small wheel deflections, transitioning to a firmer spring rate as wheel travel is consumed, thereby preventing suspension "bottom out".

It should be noted that the structure of the suspension system of the present invention, using leaf springs operably coupled between the rocker member 38 and an arm of the control, provides for a lower center of gravity and lower vehicle weight than provided by coil spring suspension designs of the prior art. Furthermore, because separate linkages drive the leaf spring and the rotary dampers, the leverage ratios and damping curves may be independently adjusted for optimal performance and tuning of the suspension system. Prior art leaning vehicle suspensions with coil springs and telescopic dampers have a significantly higher center of gravity than provided by the present invention, and the compact and light design possible only with the present invention's structure provides for a much lighter, stronger, and simpler main vehicle frame design.

It should further be noted that the structure of the present invention, with the rocker member pivoting upon the pivot bearing about a longitudinal axis of the vehicle, decouples the damping and spring action response of the up and down movement of the wheels from the lean of the vehicle, and causes the left and right wheels to maintain substantially constant relative camber with respect to each other as they move up and down and as the vehicle leans left and right. This allows the wheels to move up and down in response to bumps at any operable lean angle, in contrast to prior art designs.

The suspension 30 preferably further includes lean brake means 142 for braking the pivoting movement of rocker member 38 about the longitudinal axis 36. Preferably, lean brake means 142 includes a pie-shaped disk brake slice 144 anchored fixedly to the vehicle frame 34, and a lean brake caliper 146 fixedly mounted to rocker member 38, such that, when caliper 146 engages with disk brake slice 144, changing vehicle lean is resisted or even locked from happening if the lean brake is fully engaged. Actuation of caliper 146 is via well-known operator actuation such as a well-known hydraulic, electronic, or cable braking system, and creates a strong frictional connection between the rocker member 38 and the vehicle frame, thereby selectively reducing or eliminating the leaning motion that is critical to the operation of the suspension system 30. This may be desirable in low speed situations to facilitate balance or to eliminate the need for the rider to support the vehicle with his or her feet. The lean brake can also be used in cornering maneuvers where it may be desirable to selectively increase resistance to vehicle lean angle change, such as would be desirable to prevent a "high side" accident or during high-speed steady-state cornering. The preferred operator actuation of the lean brake means is by a well-known thumb brake lever mounted on the left handlebar, because such a configuration would allow simultaneous use of the vehicle's clutch and lean brake with the left hand, leaving the right hand and both legs free for use with operation of the vehicle in the usual manner.

Experimental testing of the lean brake means 142 has shown that a mountain bike brake caliper is insufficient for use on a performance vehicle such as the present invention, and a heavier-duty brake caliper, such as might be found on a racing ATV, is indicated. Bronze brake pads should be used to facilitate low friction operation when the lean brake is disengaged.

Preferred specifications for the prototype of the first embodiment of the present invention are shown below in Table 1:

TABLE 1

| Preferred Specifications | |
| --- | --- |
| Engine: | 618 cc Ducati Desmo Due L-Twin 60 HP @ 9500 RPM, 39.3 ft-lbs. torque @ 6750 RPM |
| Rolling: | Front tire: 2 x Metzler Sporttec M3 120/60-17 Rear tire: Metzler Sporttec M3 160/60-17 Front Wheels: Aprillia Sintesi Rear Wheel: Ducati Monster 620 |
| Front Suspension: | Parallelogram Double-Wishbone with Floating Rocker Spring: Flex-a-Form Fiberglass Composite Mono-Leaf Wheel Travel: 5 inches (12.7 cm.) vertical, 29.7 inches (75.4 cm.) articulating Wishbones: Laeger Pro-Trax +3+1 (Modified) Spindles: Laeger Pro-Trax Hubs: 3 x 144 mm pattern Dampers: Kayaba Oil-Dampened Rotary (Suzuki TL1000R) Roll Damper: Scott's Performance Rotary Steering Damper with HI/LOW speed adjust Steering Damper: GPR Rotary Steering Damper |
| Rear Suspension: | Top link monoshock swing arm Wheel Travel: 5.8 inches (14.7 cm.) |
| Brakes: | Front Brakes: Twin Hydraulic Disk Rear Brake: Single 245 mm. Hydraulic Disk |
| Dimensions: | Length: 82.7 inches (210 cm.) Width: 46 inches (117 cm.) Wheelbase: 56.7 inches (144 cm.) Seat Height: 30.3 inches (77.0 cm.) Dry Weight: 450 lbs. (204 kg.) Weight Distribution: 60% Front, 40% Rear |

Now that the first embodiment 30 is understood, the improvements of the second preferred embodiment 2.30 can be disclosed and explained.

It is not necessary to discuss all details of the second embodiment 2.30 because it should be understood that similar structure for the two embodiments serves similar purpose. The reference numerals for the various parts of the second embodiment shall be understood to have a prefix identifying the second embodiment (e.g., "2.") and a suffix identifying the particular structure (e.g., "34", "36", etc.) corresponding to the first embodiment's similar structure. Only the specific differences of the second embodiment from the first need be explained.

Referring to FIGS. 17-23, in contrast to the first embodiment, in the second embodiment 2.30, the pivotal mounting to vehicle frame 2.34 of the first end 2.80 of the left upper arms 2.76, 2.78 is coaxial with the pivotal mounting to vehicle frame 2.34 of the first end 2.80 of the right upper arms 2.76, 2.78. Likewise, also in contrast to the first embodiment, in the second embodiment 2.30, the pivotal mounting to vehicle frame 2.34 of the first end 2.88 of the left lower arms 2.84, 2.86 is coaxial with the pivotal mounting to vehicle frame 2.34 of the first end 2.88 of the right lower arms 2.84, 2.86 and furthermore, for efficiency in mounting, also preferably coaxial with the longitudinal axis 2.36 about which rocker member 2.38 pivots. This change preserves perfectly level suspension geometry, relative to the road, throughout the lean angle, thereby eliminating unwanted "jacking" of the suspension relative to the road as the vehicle leans. This makes the second embodiment have superior anti jacking characteristics as compared to the first embodiment, thereby creating a safer vehicle.

To use both embodiments of the present invention, the rider steers leans left and right as desired, and the suspension system provides improved safety, better gripping of the road than prior art vehicles, providing the improved safety of four-wheeled vehicles while preserving the performance of a two-wheeled vehicle.

Although the present invention has been described and illustrated with respect to a preferred embodiment and a preferred use therefor, it is not to be so limited since modifications and changes can be made therein which are within the full intended scope of the invention.

We claim:

1. A leaning vehicle suspension for a vehicle, said vehicle having a vehicle frame, said vehicle frame having a longitudinal axis, and said suspension comprising:
   (a) a rocker member;
   (b) a pivot bearing mounting said rocker member to said vehicle frame for pivoting movement of said rocker member with respect to said vehicle frame about said longitudinal axis;
   (c) a left wheel mounting member and a right wheel mounting member;
   (d) left and right wheels respectively mounted for rotation upon said left and right wheel mounting members;
   (e) left control arm means interposed between said vehicle frame and said left wheel mounting member, and right control arm means interposed between said vehicle frame and said right wheel mounting member, each of said left and right control arm means respectively comprising:
      i. an upper arm pivotally mounted at a first end thereof to said vehicle frame and pivotally mounted at a second end thereof to its respective said wheel mounting member; and
      ii. a lower arm pivotally mounted at a first end thereof to said vehicle frame and pivotally mounted at a second end thereof to its said respective said wheel mounting member;
   said upper arm and said lower arm having substantially equal length, and said pivotal mounting of said first end of said upper arm being spaced from said pivotal mounting of said first end of said lower arm by a first distance and said pivotal mounting of said second end of said upper arm being substantially spaced from said pivotal mounting of said second end of said lower arm by said first distance;
   (f) a left rotary damper mounted to said rocker member and operably coupled to one of said upper and lower arms of said left control arm means;
   (g) a left transverse leaf spring arm mounted to said rocker member and operably coupled to said one of said upper and lower arms of said left control arm means;
   (h) a right rotary damper mounted to said rocker member and operably coupled to one of said upper and lower arms of said right control arm means; and
   (i) a right transverse leaf spring arm mounted to said rocker member and operably coupled to said one of said upper and lower arms of said left control arm means.

2. The suspension as recited in claim 1, in which said suspension further comprises lean brake means for braking said pivoting movement of said rocker member about said longitudinal axis.

3. The suspension as recited in claim 1, in which said pivotal mounting of said upper arm of said left control means to said vehicle frame is coaxial with said pivotal mounting of said upper arm of said right control means to said vehicle frame, and said pivotal mounting of said lower arm of said left control means to said vehicle frame is coaxial with said pivotal mounting of said lower arm of said right control means to said vehicle frame.

4. The suspension as recited in claim 3, in which said suspension further comprises lean brake means for braking said pivoting movement of said rocker member about said longitudinal axis.

5. The suspension as recited in claim 3, in which said coaxial pivotal mounting of said lower arms of said left and right control means is also coaxial with said longitudinal axis.

6. The suspension as recited in claim 5, in which said suspension further comprises lean brake means for braking said pivoting movement of said rocker member about said longitudinal axis.

* * * * *